US008716913B2

(12) United States Patent
Kvam et al.

(10) Patent No.: US 8,716,913 B2
(45) Date of Patent: May 6, 2014

(54) DEVICES AND METHODS FOR MAGNETIC POLE AND BACK IRON RETENTION IN ELECTROMAGNETIC MACHINES

(75) Inventors: Michael A. Kvam, Polson, MT (US); Brian J. Sullivan, Boulder, CO (US); James David Duford, Polson, MT (US); James D. Jore, Polson, MT (US); Matthew B. Jore, Ronan, MT (US); David Samsel, Missoula, MT (US); James S. Smith, Lyons, CO (US)

(73) Assignee: Boulder Wind Power, Inc., Louisville, CO (US)

( * ) Notice: Subject to any disclaimer, the term of this patent is extended or adjusted under 35 U.S.C. 154(b) by 0 days.

(21) Appl. No.: 13/568,791

(22) Filed: Aug. 7, 2012

(65) Prior Publication Data

US 2014/0042868 A1 Feb. 13, 2014

(51) Int. Cl.
*H02K 1/06* (2006.01)
*H02K 1/27* (2006.01)

(52) U.S. Cl.
USPC ......... 310/156.49; 310/216.079; 310/216.086

(58) Field of Classification Search
USPC ............. 310/156.08, 156.49, 156.55, 156.59, 310/216.074, 216.079, 216.082, 216.084, 310/216.086, 216.087, 266–268
See application file for complete search history.

(56) References Cited

U.S. PATENT DOCUMENTS 2,673,302 A * 3/1954 Gynt ........................ 310/156.49
4,146,806 A 3/1979 Katsumata
4,268,773 A 5/1981 Beck et al.
4,318,019 A 3/1982 Teasley et al.
4,668,109 A 5/1987 Basso
4,697,114 A 9/1987 Amemiya et al.
5,091,668 A * 2/1992 Cuenot et al. ............ 310/156.61
5,289,042 A 2/1994 Lis
5,757,091 A * 5/1998 Sogabe et al. ............ 310/12.02
5,844,324 A 12/1998 Spriggle
5,844,341 A 12/1998 Spooner et al.
5,952,755 A 9/1999 Lubas
6,054,790 A 4/2000 Kjeer et al.
6,160,336 A 12/2000 Baker, Jr. et al.
6,175,177 B1 * 1/2001 Sabinski et al. ......... 310/156.55
6,249,058 B1 6/2001 Rea
6,278,197 B1 8/2001 Appa
6,373,161 B1 4/2002 Khalaf
6,426,580 B1 7/2002 Ikeda et al.
6,429,552 B2 8/2002 Asao et al.
6,476,513 B1 11/2002 Gueorguiev
6,476,534 B1 11/2002 Vanderbeck et al.

(Continued)

OTHER PUBLICATIONS

Office Action for U.S. Appl. No. 13/692,083; mailed on Sep. 6, 2013, 12 pages.

(Continued)

*Primary Examiner* — Tran Nguyen
(74) *Attorney, Agent, or Firm* — Cooley LLP

(57) ABSTRACT

In some embodiments, an electromagnetic machine includes a rotor element configured for movement relative to a stator. The rotor element includes a support member, a backing member, and a magnetic pole assembly. The support member includes a first coupling portion. The backing member is formed, at least in part, from a ferromagnetic material and the magnetic pole assembly is configured to be coupled to the backing member. The magnetic pole assembly and/or the backing member include a second coupling portion configured to removably couple the backing member and the magnetic pole assembly collectively to the first coupling portion of the support member.

23 Claims, 12 Drawing Sheets

(56) References Cited

U.S. PATENT DOCUMENTS

| | | | |
|---|---|---|---|
| 6,476,535 | B1 | 11/2002 | Oohashi et al. |
| 6,481,090 | B1 | 11/2002 | Franco et al. |
| 6,522,045 | B2 | 2/2003 | Ikeda et al. |
| 6,522,046 | B2 | 2/2003 | Ikeda et al. |
| 6,541,877 | B2 | 4/2003 | Kim et al. |
| 6,598,573 | B2 | 7/2003 | Kobayashi |
| 6,756,719 | B1 | 6/2004 | Chiu |
| 6,794,777 | B1 | 9/2004 | Fradella |
| 6,794,781 | B2 | 9/2004 | Razzell et al. |
| 6,836,028 | B2 | 12/2004 | Northrup et al. |
| 6,836,036 | B2 | 12/2004 | Dubé |
| 6,841,892 | B1 | 1/2005 | Le Nabour et al. |
| 6,844,656 | B1 | 1/2005 | Larsen et al. |
| 6,849,965 | B2 | 2/2005 | Le Nabour et al. |
| 6,891,302 | B1 | 5/2005 | Gabrys |
| 6,929,671 | B2 | 8/2005 | Kim et al. |
| 6,930,413 | B2 * | 8/2005 | Marzano .................... 310/12.18 |
| 6,943,478 | B2 | 9/2005 | Zepp et al. |
| 6,969,937 | B1 * | 11/2005 | Schuering ................ 310/156.48 |
| 7,042,109 | B2 | 5/2006 | Gabrys |
| 7,042,110 | B2 | 5/2006 | Mikhail et al. |
| 7,045,925 | B2 | 5/2006 | Fräger et al. |
| 7,049,719 | B2 | 5/2006 | Wobben |
| 7,064,455 | B2 | 6/2006 | Lando |
| 7,081,696 | B2 | 7/2006 | Ritchey |
| 7,088,029 | B2 | 8/2006 | Hiramatsu |
| 7,109,625 | B1 | 9/2006 | Jore et al. |
| 7,135,952 | B2 | 11/2006 | Harding |
| 7,154,192 | B2 | 12/2006 | Jansen et al. |
| 7,154,193 | B2 | 12/2006 | Jansen et al. |
| 7,170,212 | B2 | 1/2007 | Balson et al. |
| 7,180,204 | B2 | 2/2007 | Grant et al. |
| 7,186,083 | B2 | 3/2007 | Bayly |
| 7,205,678 | B2 | 4/2007 | Casazza et al. |
| 7,215,038 | B2 | 5/2007 | Bacon |
| 7,218,012 | B1 | 5/2007 | Edenfeld |
| 7,230,361 | B2 | 6/2007 | Hirzel |
| 7,245,037 | B2 | 7/2007 | Ängquist et al. |
| 7,285,890 | B2 | 10/2007 | Jones et al. |
| 7,345,377 | B2 | 3/2008 | Bacon |
| 7,355,309 | B2 | 4/2008 | Costin et al. |
| 7,365,472 | B2 | 4/2008 | Hiramatsu |
| 7,385,330 | B2 | 6/2008 | Trzynadlowski et al. |
| 7,492,074 | B1 | 2/2009 | Rittenhouse |
| 7,579,742 | B1 | 8/2009 | Rittenhouse |
| 7,592,712 | B2 | 9/2009 | Perlo et al. |
| 7,592,766 | B2 | 9/2009 | Patel et al. |
| 7,640,648 | B1 | 1/2010 | Rittenhouse |
| 7,714,479 | B2 | 5/2010 | Seneff et al. |
| 7,723,891 | B2 | 5/2010 | Rittenhouse |
| 7,750,522 | B2 | 7/2010 | Gizaw et al. |
| 7,772,741 | B1 | 8/2010 | Rittenhouse |
| 7,781,932 | B2 | 8/2010 | Jansen |
| 7,830,057 | B2 | 11/2010 | Gieras |
| 7,868,510 | B2 | 1/2011 | Rittenhouse |
| 8,040,011 | B2 | 10/2011 | Mueller et al. |
| 8,178,992 | B1 | 5/2012 | Meller |
| 2006/0220483 | A1 | 10/2006 | Jones et al. |
| 2008/0024018 | A1 * | 1/2008 | Rignault et al. ................ 310/42 |
| 2012/0001508 | A1 | 1/2012 | Mantere et al. |
| 2012/0217831 | A1 | 8/2012 | Jore et al. |

OTHER PUBLICATIONS

U.S. Appl. No. 13/692,083, filed Dec. 3, 2012, 62 pages.

* cited by examiner

1460

Remove from a rotor support structure one magnetic pole and ferromagnetic back member assembly
1462

Insert a replacement magnetic pole and ferromagnetic backing member assembly at the open location on the rotor support structure
1464

DEVICES AND METHODS FOR MAGNETIC POLE AND BACK IRON RETENTION IN ELECTROMAGNETIC MACHINES

BACKGROUND

Some embodiments described herein relate to electromagnetic machines and more particularly to devices and methods for removably coupling a magnetic pole assembly and a backing member to a support structure of a rotor element.

Permanent magnet electromagnetic machines (referred to as "permanent magnet machines" or "electromagnetic machines" herein) utilize magnetic flux from permanent magnets to convert mechanical energy to electrical energy or vice versa. Various types of permanent magnet machines are known, including axial flux machines, radial flux machines, and transverse flux machines, in which one component rotates about an axis or translates along an axis, either in a single direction or in two directions (e.g., reciprocating, with respect to another component). Such machines typically include windings to carry electric current through coils that interact with the flux from the magnets through relative movement between the magnets and the windings. In a common industrial application arrangement, the permanent magnets are mounted for movement (e.g., on a rotor or otherwise moving part) and the windings are mounted on a stationary part (e.g., on a stator or the like). Other configurations, typical for low power, inexpensive machines operated from a direct current source where the magnets are stationary and the machine's windings are part of the rotor (energized by a device known as a "commutator" with "brushes") are clearly also available, but will not be discussed in detail in the following text in the interest of brevity.

In an electric motor, for example, current is applied to the windings in the stator, causing the magnets (and therefore the rotor) to move relative to the windings, thus converting electrical energy into mechanical energy. In a generator, application of an external force to the generator's rotor causes the magnets to move relative to the windings, and the resulting generated voltage causes current to flow through the windings-thus converting mechanical energy into electrical energy.

Surface mounted permanent magnet machines are a class of permanent magnet machines in which the magnets are typically mounted on a ferromagnetic structure, or backing, commonly referred to as a back iron. In some such machines, multiple magnetic pole assemblies are permanently affixed or otherwise attached to the back iron in a manner that may not allow for easy and/or efficient removal of, for example, a single magnetic pole assembly, if needed. For example, if a magnetic pole assembly no longer functions at a sufficient level, it may be desirable to remove and replace that magnetic pole assembly without having to remove a larger section of the machine.

Further, in some such machines, the handling of components that have significant attractive and/or repulsive forces to the magnet pole assembly and/or to the support structure (e.g., the back iron) can be challenging. Such magnetic forces can be difficult to control, as they typically increase as the components are brought closer together, and may cause deflection in unfavorable directions.

Thus, a need exists for improved apparatus and methods to couple a magnetic pole assembly to a support structure of an electromagnetic machine (e.g., a permanent magnet machine) to aid in the magnetization, handling and servicing of the electromagnetic machine.

SUMMARY

Apparatus and methods for coupling a magnetic pole assembly and a backing member to a support structure of a rotor element included in an electromagnetic machine are described herein. In some embodiments, an electromagnetic machine includes a rotor element configured for movement relative to a stator. The rotor element includes a support member, a backing member, and a magnetic pole assembly. The support member includes a first coupling portion. The backing member is formed, at least in part, from a ferromagnetic material and the magnetic pole assembly is configured to be coupled to the backing member. The magnetic pole assembly and/or the backing member include a second coupling portion configured to removably couple the backing member and the magnetic pole assembly collectively to the first coupling portion of the support member.

DETAILED DESCRIPTION

Figure 1:
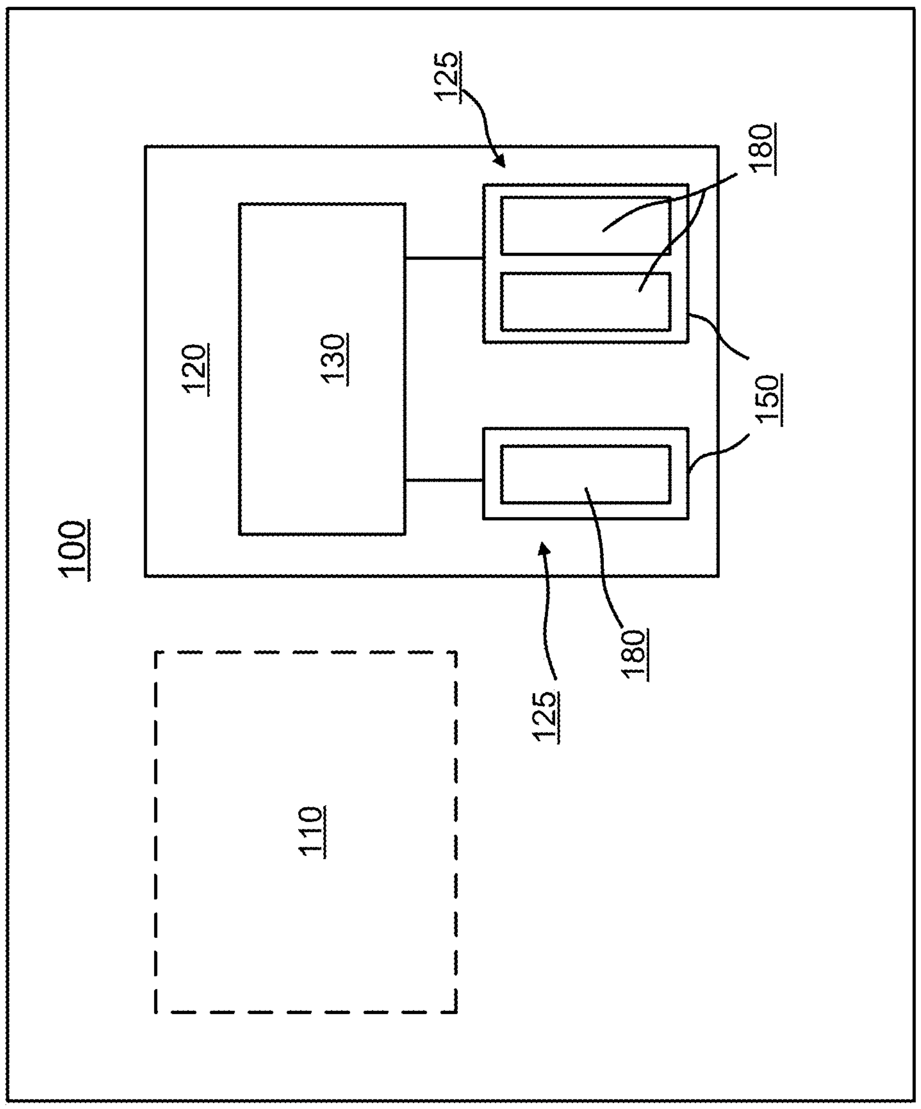
FIG. 1 is a schematic illustration of a structure for an electromagnetic machine, according to an embodiment.

Apparatus and methods for coupling a magnetic pole assembly to a support structure of a rotor included in an electromagnetic machine are described herein. In some embodiments, an apparatus includes a rotor element configured for movement relative to a stator. The rotor element includes a support member, a backing member, and a magnetic pole assembly. The support member includes a first coupling portion. The backing member is formed, at least in part, from a ferromagnetic material and the magnetic pole assembly is configured to be coupled to the backing member.

The magnetic pole assembly and/or the backing member include a second coupling portion configured to removably couple the backing member and the magnetic pole assembly collectively to the first coupling portion of the support member.

In some embodiments, an apparatus includes a rotor element configured for movement relative to a stator. The rotor element includes a support member, a backing member, and multiple magnetic pole assemblies. The backing member is formed from a ferromagnetic material. The magnetic pole assemblies are configured to be coupled to the backing member such that the backing member and the magnetic pole assemblies collectively can be removably coupled to the support member.

In some embodiments, an apparatus includes a rotor element configured for movement relative to a stator. The rotor element includes a first support member, a second support member, a first set of magnetic pole assemblies, a second set of magnetic pole assemblies, a first backing member, and a second backing member. The first backing member and the second backing member are formed from a ferromagnetic material. The first set of magnetic pole assemblies are configured to be coupled to the first backing member such that the first backing member and the first set of magnetic pole assemblies collectively can be removably coupled to the first support member. The second set of magnetic pole assemblies are configured to be coupled to the second backing member such that the second backing member and the second set of magnetic pole assemblies collectively can be removably coupled to the second support member. The rotor element is configured such that the second set of magnetic pole assemblies is disposed at a non-zero distance and facing the first set of magnetic pole assemblies. Each magnetic pole assembly included in the first set of magnetic assemblies has a polarity that is opposite the corresponding magnetic pole assembly of the second set of magnetic pole assemblies such that the first set of magnetic pole assemblies and the second set of magnetic pole assemblies collectively define an independent magnetic flux path.

In some embodiments, a rotor assembly includes any number of magnetic pole and ferromagnetic backing member assemblies that are releasably retained on a rotor support structure. In some embodiments, a method of repairing such a generator rotor includes removing one of the magnetic pole and ferromagnetic backing member assemblies from the rotor support structure. The method further includes inserting a replacement magnetic pole and ferromagnetic backing member assembly at the location on the rotor support structure where the one magnetic pole and ferromagnetic backing member assembly was removed.

Electromagnetic machines as described herein can be various types of permanent magnet machines, including axial flux machines, radial flux machines, and transverse flux machines, in which one component rotates about an axis or translates along an axis, either in a single direction or in two directions (e.g., reciprocating, with respect to another component). Such machines typically include windings to carry electric current through coils that interact with the flux from the magnets through relative movement between the magnets and the windings. In a common industrial application arrangement (including the embodiments described herein), the permanent magnets are mounted for movement (e.g., on a rotor or otherwise moving part) and the windings are mounted on a stationary part (e.g., on a stator or the like).

Embodiments described herein can be used in relatively large electromagnetic machines and/or components such as those found in wind power generators. Embodiments described herein can also be implemented in other types of electromagnetic machines and mechanisms, such as, for example, other types of generators and/or motors.

FIG. 1 is a schematic illustration of a structure for an electromagnetic machine 100, according to an embodiment. The structure for an electromagnetic machine 100 (also referred to herein as "machine structure") can be disposed in a machine, such as, for example, an axial flux, radial flux, transverse flux machine, or translational linear electromagnetic machines. The machine structure 100 can be, for example, a structure implemented within a generator or a motor. More specifically, the machine structure 100 described herein can include a stator assembly 110 and a rotor assembly 120 that can move relative to the stator assembly 110. For example, in some embodiments, the rotor assembly 120 can rotate relative to the stator assembly 110 (e.g., rotates with the direction of flux from rotor to stator generally in the axial or radial direction) or can move linearly relative to the stator assembly 110. The stator assembly 110 can include or support, for example, an air core type stator (not shown in FIG. 1) without any ferromagnetic material to support a set of copper windings or conduct magnetic flux. An air core stator can include an annular array of stator segments (not shown in FIG. 1) and one or more conductive windings (not shown) or one or more magnets (not shown in FIG. 1). For example, the stator assembly 110 can include stator segments such as the stator segments described in U.S. Patent Application Publication No. 2011/0273048, the disclosure of which is incorporated herein by reference in its entirety. Each air core stator segment can include a printed circuit board sub-assembly (not shown in FIG. 1), or other means known of structurally encapsulating the windings in non-ferromagnetic materials. In some embodiments, the printed circuit board sub-assemblies can be similar to those described in U.S. Pat. No. 7,109,625, the disclosure of which is incorporated herein by reference in its entirety (referred to henceforth as the "'625 patent"). In some embodiments, a stator assembly 110 can include or support a conventional iron-core construction arranged similarly to the air core concept described above.

The rotor assembly 120 can include a support member 130 that can be coupled to one or more additional support members (not shown in FIG. 1) of the rotor assembly 120. The support member 130 can support one or more magnetic pole and backing assemblies 125 (also referred to herein as "magnetic assembly"). The support member 130 can be any suitable structure. In some embodiments, the support member 130 can be a rotor segment, such as, for example, those described in U.S. patent application Ser. No. 13/152,164, filed Jun. 2, 2011, the disclosure of which is incorporated herein by reference in its entirety. In some embodiments, the support member 130 can be formed from a ferromagnetic material. In other embodiments, the support member 130 need not be formed from a ferromagnetic material. While not shown in FIG. 1, the rotor assembly 120 can further include a hub and support members configured to be coupled to the support member 130 (e.g., the rotor segments). In this manner, any suitable number of support members 130 can be coupled to form a rotor assembly that can be configured to move (e.g., rotate or translate) relative to the stator assembly 110, as described in further detail herein.

The magnetic assemblies 125 can each include at least one magnetic pole assembly 180 (also referred to herein as "magnetic pole") and at least one backing member 150. The magnetic pole 180 can be any suitable configuration. For example, in some embodiments, the magnetic pole 180 can include an array of magnets such as, permanent magnets, electromagnets or a combination thereof. For example, in an induction machine or wound field synchronous machine, the magnets are electromagnets. In some embodiments, the magnetic pole 180 can be configured as a flux focusing magnetic pole assembly substantially similar in form and/or function to those described in U.S. patent application Ser. Nos. 13/437,639 and 13/438,062, each filed Apr. 2, 2012, the disclosures of which are incorporated herein by reference in their entirety (referred to henceforth as the "'639 and '062 applications").

The backing member 150 can be any suitable shape, size, or configuration. For example, in some embodiments, the backing member 150 can be formed at least in part from a ferromagnetic material. In such an embodiment, the support structure 130 to which the magnetic assembly 125 (e.g., the magnetic pole 180 and the backing member 150) is coupled can be formed with a non-ferromagnetic material. In some embodiments, when the backing member 150 is magnetically permeable (e.g., formed with a ferromagnetic material), the backing member 150 can be permanently magnetized. For example, magnetization of the magnetic assembly 125 can result in the magnetization of the backing member 150. In some embodiments, the backing member can be magnetized individually (e.g., prior to coupling a magnetic pole 180 thereto). With such magnetization, further improvements to magnetic performance can be achieved, such as, for example, providing an additional source of magnetic field, and improving the permeability of the magnetic assembly 125.

The backing member 150 can receive and/or be coupled to any suitable number of magnetic poles 180. For example, in some embodiments, two or more magnetic poles 180 can be coupled to the backing member 150, in any suitable manner. In other embodiments, a single magnetic pole 180 is coupled to the backing member 150, in any suitable manner.

In some embodiments, one or more retention members (not shown in FIG. 1) can be used to retain one or more magnetic poles 180 relative to the backing member 150. Expanding further, the retention member(s) can be configured to contact at least a portion of the magnetic pole 180 to orient the magnetic pole 180 relative to the backing member 150. In this manner, the magnetic pole 180 can be coupled to the backing member 150 in any suitable arrangement. In addition to the retention member(s), the magnetic pole 180 can be coupled to the backing member 150 by any suitable coupler. For example, in some embodiments, a coupler can be a mechanical fastener, an adhesive, a solder coupling, a sintered coupling, and/or the like. In this manner, the coupler(s) and the retention member(s) (not shown in FIG. 1) can collectively couple the magnetic pole 180 to the backing member 150 substantially without introducing undesirable effects on a magnetic flux flow between the backing member 150 and the magnetic pole 180. As shown in FIG. 1, in some embodiments, two magnetic poles 180 can be coupled to the backing member 150 in a similar manner as described. In other embodiments, more than two magnetic poles 180 can be coupled to the backing member 150 in any suitable manner.

While not shown in FIG. 1, in some embodiments, the magnetic pole 180 can be sealed in a corrosion resistant coating after being coupled to the backing member 150. In some embodiments, the corrosion resistant coating can include plating, painting, chemical conversion, or the like. In an exemplary embodiment, the magnetic pole 180 can be covered in a polymer such as epoxy, to form a relatively thick and dimensionally consistent package (e.g., the coating of a magnetic pole assembly can be sufficiently precise such that a first magnetic pole assembly coupled to a first backing member is substantially similar in size to a second magnetic pole assembly coupled to a second backing member). In some embodiments, the magnetic assembly 125 can be coated or sealed. Similarly stated, in some embodiments, the magnetic pole 180 and the backing member 150 or a portion of the backing member 180 can be collectively sealed using a coating as described above.

The magnetic pole 180 and the backing member 150 (e.g., the magnetic assembly 125) can be collectively removably coupled to the support member 130. In some embodiments, the support member 130 can include a first coupling portion (not shown in FIG. 1) and the backing member 150 and/or the magnetic pole 180 can include a second coupling portion (not shown in FIG. 1) that can be coupled to the first coupling portion. In some embodiments, the magnetic assembly 125 can include a second coupling portion that can be slidably received within the first coupling portion of the support member 130. For example, in some embodiments, the first coupling portion of the support member 130 can be a groove (not shown) defined in the support member 130 that can receive a mating protrusion (e.g., a second coupling portion, not shown in FIG. 1) of the backing member 150. In some embodiments, the protrusion can have a T-shaped cross-section and the groove in the support member 130 can have a mating T-shaped cross-section. In some embodiments, the protrusion can have a dovetail-shaped cross-section and the groove in the support member 130 can have a mating dovetail-shaped cross-section. In some embodiments, the backing member 150 can define a groove configured to matingly receive a protrusion on the support member 130. In some embodiments, the support member 130 can include a first coupling portion that includes a window or opening (not shown) defined in the support member 130 that can receive a portion of the magnetic assembly 125 therethrough. For example, a portion of the magnetic pole 180 can be received through the opening. In some embodiments, in addition to the above described first coupling portion and second coupling portion, the magnetic pole 180 and backing member 150 (the magnetic assembly 125) can be further coupled to the support member 130 with the use of a mechanical fastener(s) or retention mechanism(s). In some embodiments, a portion of a magnetic force can be operative to couple the magnetic pole 180 and/or the backing member 150 to the support member 130, as described in more detail herein.

Figure 2:
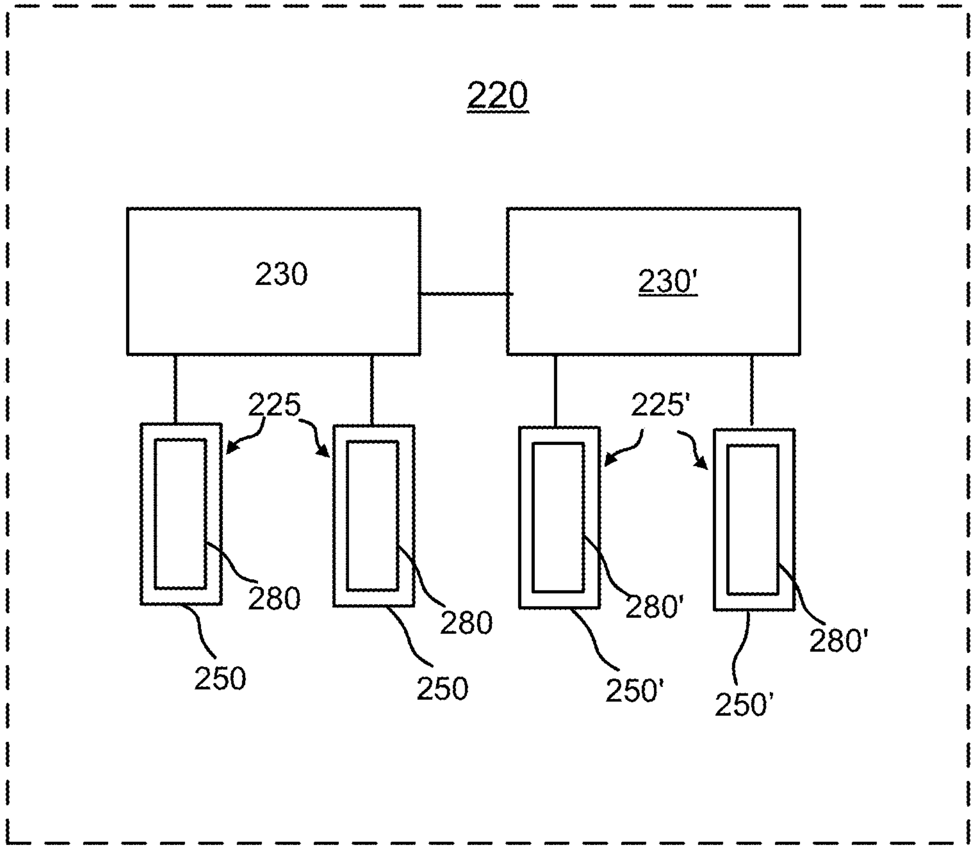
FIG. 2 is a schematic illustration of a rotor assembly, according to an embodiment.

FIG. 2 illustrates an example embodiment of a rotor assembly. A rotor assembly 220 can include a first support structure 230 having one or more magnetic pole and backing member assemblies 225 (also referred to herein as "magnetic assembly") removably coupled thereto. In this embodiment, the support structure 230 has two magnetic assemblies 225 coupled thereto. The support structure 230 can be any suitable structure. For example, in some embodiments, the support structure 230 is substantially similar to the support structure 130 described above with reference to FIG. 1. Additionally, the magnetic assembly 225 can be configured substantially similar or the same as the magnetic assembly 125 described above in reference to FIG. 1. For example, the magnetic assemblies 225 can each include a magnetic pole assembly 280 (also referred to herein as "magnetic pole") coupled to a backing member 250.

The rotor assembly 220 can also include a second support structure 230' having one or more magnetic assemblies 225' coupled thereto. The support structure 230' and the magnetic assembly 225' can be substantially similar to the support structure 230 and the magnetic assemblies 225. In this manner, the magnetic assemblies 225' can each include a magnetic pole 280' and a backing member 250' that are substantially similar to the magnetic pole 280 and backing member 250.

As shown in FIG. 2, the first support structure 230 can be coupled to the second support structure 230' to form at least a portion of the rotor assembly 220. For example, in some embodiments, the first support structure 230 can be a first portion of an annular support structure of the rotor assembly 220, and the second support structure 230' can be a second portion of an annular support structure of the rotor assembly 220. In this manner, the rotor assembly 220 can be disposed within an electromagnetic machine (e.g., a generator) and configured to move relative to a stator such that the magnetic assemblies 225 and 225' facilitate the flow of an electrical current through a portion of the stator.

While the rotor assembly 220 is shown in FIG. 2 as including the first support structure 230 and the second support structure 230', in other embodiments, a rotor assembly can include any number of support structures. For example, in some embodiments, it can be desirable to form a rotor assembly from more than two support structures. In such embodiments, the use of multiple support structures that can be coupled together at a desired installation site can reduce the size and weight of the components during manufacturing, handling and transportation of the rotor assembly.

Figure 3:
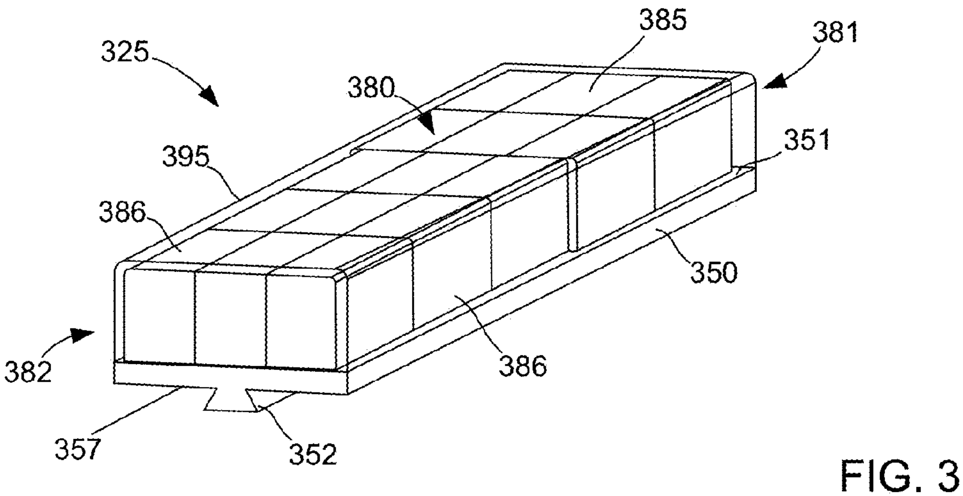
FIGS. 3-5 are each a perspective view of a magnetic pole and backing member assembly, according to different embodiments.

Referring now to FIG. 3, a magnetic pole and backing member assembly 325 (also referred to herein as "magnetic assembly") is illustrated according to an embodiment. The magnetic assembly 325 includes a magnetic pole assembly 380 (also referred to herein as "magnetic pole") coupled to a backing member 350. The magnetic pole 380 can be any suitable magnetic assembly or array (e.g., can include any suitable number of individual magnets in any suitable arrangement). For example, as shown in FIG. 3, the magnetic pole 380 includes a first portion 381 and a second portion 382. As shown in FIG. 3, the first portion 381 of the magnetic pole 380 can have a width that is greater than a width of the second portion 382. Such a configuration can, for example, facilitate the alignment of the magnetic pole 380 relative to a support member (not shown in FIG. 3) when the magnetic assembly 325 is being coupled to the support member, as described in further detail herein.

In this embodiment, the magnetic pole 380 includes a set of fifteen magnets that are disposed in five rows of three magnets. In such embodiments, the five rows of three magnets can include two rows of magnets 386 disposed along the outer side edges of the magnetic assembly 325 adjacent to and on opposite sides of a center row of magnets 385. The magnetic pole 380 can be configured, for example, to focus the flow of magnetic flux to increase the flux density of the magnetic pole assembly as described in detail in the '639 and '062 applications incorporated by reference above. While the magnetic pole 380 is described as including fifteen magnets, in other embodiments, the magnetic pole 380 can include any suitable number of magnets disposed in any suitable configuration. For example, in some embodiments, a magnetic pole includes a single magnet. In other embodiments, a magnetic pole includes more or less than fifteen magnets.

The magnetic assembly 325 can further include a corrosion resistant coating 395 that can be disposed on the magnetic pole 380. In some embodiments, the corrosion resistant coating 395 can include, for example, plating, painting, chemical conversion, or the like as described above with respect to FIG. 1. In some embodiments, the corrosion resistant coating 395 can be a polymer such as, for example, an epoxy, and can form a relatively thick and dimensionally consistent coating over the magnetic pole 380. For example, as shown in FIG. 3, the coating 395 can be applied such that the collective length and width of the magnetic pole 380 and the coating 395 are substantially similar to or the same as the overall length and overall width of the backing member 350. While not shown in FIG. 3, in some embodiments, the coating 395 can be disposed on both the magnetic pole 380 and the backing member 350 (e.g., the magnetic assembly 325 can be substantially completely sealed). In still other embodiments, a portion(s) of the magnetic pole 380 and/or a portion(s) of the backing member 350 can be unsealed. For example, it may be desirable to seal the magnetic pole 380 and a portion of the backing member 350, while leaving another portion of the backing member 350 unsealed (e.g., a coupling portion of the backing member 350).

The magnetic pole 380 can be coupled to the backing member 350 using a variety of different coupling methods as described above with respect to FIG. 1. In this embodiment, the magnetic pole 380 is coupled to a first coupling portion 351 of the backing member 350. As described above for previous embodiments, the backing member 350 can be a variety of different shapes, sizes, or configurations. The backing member 350 can be formed, at least in part, of a ferromagnetic material such as, for example, steel. In this manner, the backing member 350 is configured to direct a portion of a magnetic flux flow, as further described herein.

As shown in FIG. 3, the first coupling portion 351 of the backing member 350 can be a substantially flat surface portion of the backing member 350. The backing member 350 further includes a second coupling portion 352 in the form of a protrusion. The second coupling portion 352 extends from a surface 357 of the backing member 350 that is opposite the surface to which the magnetic pole 380 is coupled. As shown in FIG. 3, the second coupling portion 352 has a dovetail shape or cross-section and can be configured to engage a corresponding coupling portion (e.g., a dovetail shaped groove) of a support member (not shown in FIG. 3) to couple the magnetic assembly 325 to the support member, as further described herein (see, e.g., FIG. 11).

Figure 4:
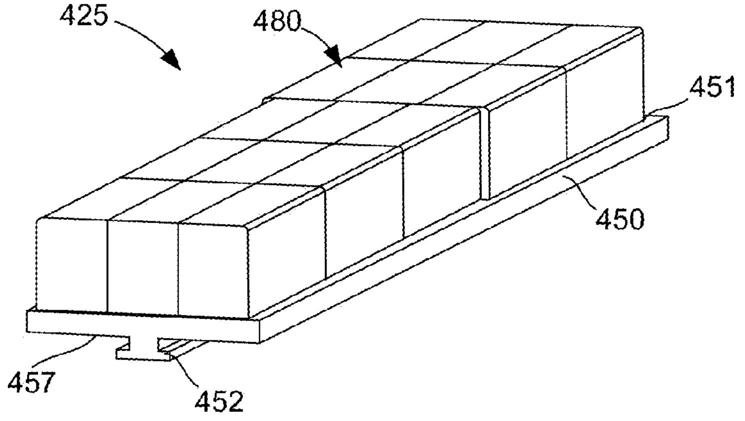

In other embodiments, a second coupling portion of the backing member can be any suitable configuration. For example, FIG. 4 illustrates a magnetic assembly 425, according to another embodiment. The magnetic assembly 425 includes a magnetic pole 480 and a backing member 450. The magnetic pole 480 can be substantially similar to the magnetic pole 380 described above in reference to FIG. 3. Thus, the magnetic pole 480 is not described in further detail herein.

The backing member 450 can be formed, at least in part, of a ferromagnetic material and includes a first coupling portion 451 to which the magnetic pole 480 is coupled. The backing member 450 also includes a second coupling portion 452 in the form of a protrusion that extends from a surface 457. In this embodiment, the second coupling portion 452 has a substantially T-shaped configuration or cross-section and can engage a corresponding coupling portion of a support member (e.g., a T-shaped groove in the support member) in a similar manner as described above for magnetic assembly 325.

Figure 5:
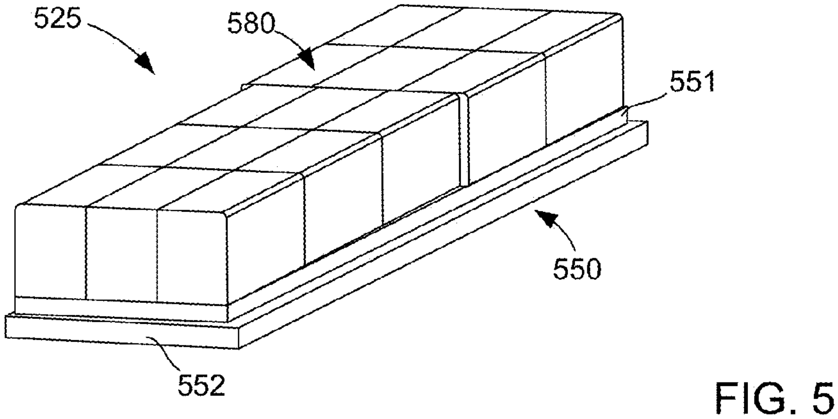

FIG. 5 illustrates another embodiment of a magnetic assembly. In this embodiment, a magnetic assembly 525 includes a backing member 550 and a magnetic pole 580 coupled to the backing member 550. The magnetic pole 580 can be substantially similar to the magnetic pole 380 described above in reference to FIG. 3. The backing member 550 can be formed, at least in part, of a ferromagnetic material includes a first coupling portion 551 to which the magnetic pole 580 can be coupled as described above for previous embodiments. The backing member 550 further includes a second coupling portion 552 that extends outward from a perimeter of the first coupling portion 551. Similarly stated, the second coupling portion 552 forms a step or flange disposed about a perimeter of the backing member 550 and has a length and width that are each larger than a length and width of the first coupling portion 551. In this manner, the second coupling portion 552 can engage a coupling portion of a support member, as described in further detail below with reference to FIG. 12.

Although not shown in FIGS. 4 and 5, in some embodiments, the magnetic assembly 425 and the magnetic assembly 525, can each include a corrosion resistant coating, such as, for example, the corrosion resistant coating 395 described in reference to the magnetic assembly 325. For example, some or all of the magnetic pole 480 and/or the backing member 450 and/or some or all of the magnetic pole 580 and/or the backing member 550 can be sealed with a coating as described above.

Figure 6:
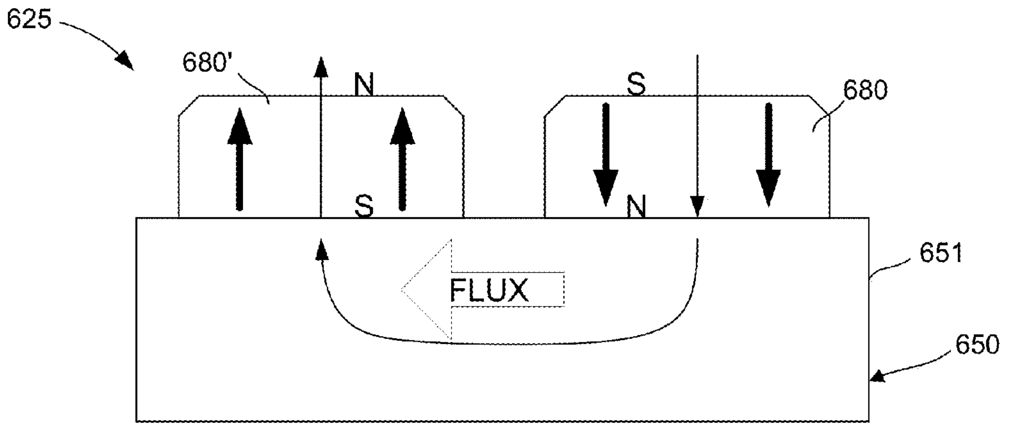
FIGS. 6-8 are each a front view of a magnetic pole and backing member assembly, according to different embodiments.

While the magnetic assemblies shown in FIGS. 3-5 (e.g., 325, 425, 525) each include a single magnetic pole coupled to a backing member, in should be understood that in alternative embodiments multiple magnetic poles can be coupled to a backing member (e.g., 350, 450, 550). For example, FIG. 6 illustrates a magnetic assembly that includes multiple magnetic poles coupled to a backing member. As shown in FIG. 6, a magnetic assembly 625 includes a backing member 650, a first magnetic pole 680 and a second magnetic pole 680'. While shown as being formed from a single magnet, the first magnetic pole 680 and the second magnetic pole 680' can be formed with multiple magnets substantially similar to the magnetic pole 380 described above in reference to FIG. 3. The first magnetic pole 680 is coupled to a first coupling portion 651 of the backing member 650 such that the north pole (labeled “N”) of the magnetic pole 680 is in contact with the backing member 650 and the south pole (labeled “S”) of the magnetic pole 680 extends away from the backing member 650. In a similar but opposite manner, the second magnetic pole 680' is coupled to the first coupling portion 651 such that the south pole is in contact with the backing member 650 and the north pole extends away from the backing member 650. In this manner, the backing member 650 can be configured to direct magnetic flux from the north pole of the first magnetic pole 680 to the south pole of the second magnetic pole 680' (as indicated by the arrow labeled “FLUX”).

While shown as including a spatial gap between the first magnetic pole 680 and the second magnetic pole 680', in other embodiments, the first magnetic pole 680 and the second magnetic pole 680' can be coupled to the first coupling portion 651 of the backing member 650 such that no spatial gap exists. Moreover, through the use of flux focusing magnetic poles (e.g., such as those described herein and those described in the ’639 and ’062 applications), a thickness of the backing member 650 can be reduced, which can result in, for example, weight reduction, reduction of manufacturing costs, reduction of shipping costs, reduction of installation time and costs, etc. In general, as the thickness of the backing member 650 is reduced, the ability of the backing member 650 to carry flux diminishes, making flux saturation more likely. Saturation increases the reluctance of the magnetic circuit, and the resulting reduction in flux causes a reduction in torque per Ampere when applied in a permanent magnet machine. When the magnetic poles 680 and 680' (e.g., flux focusing magnetic poles) are used, the orientation of polarity between neighboring poles is such that flux is encouraged to flow through the air or other separation between the poles because a portion of flux travels into and out of the sides of magnets disposed along the lateral edge of the magnetic poles 680 and 680', in addition to the backing member 650. This relieves the backing member 650 of some of its requirement to carry flux, such that the backing member 650 thickness can be reduced. In contrast, in a conventional configuration of straight-polarity magnets, nearly all of the flux flowing through the magnets is carried by a back iron (or backing member), including the greater amount of leakage flux that is lost to neighboring poles, and the back iron thickness must be sufficient to carry all of this flux.

Figure 7:
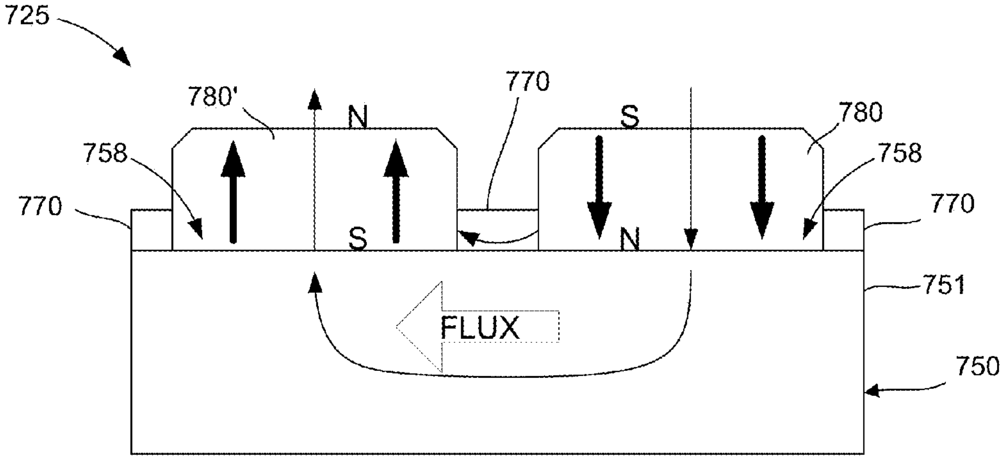

FIG. 7 illustrates a magnetic assembly 725, according to another embodiment. The magnetic assembly 725 includes a backing member 750 with a first coupling portion 751 to which a first magnetic pole 780 and a second magnetic pole 780' are coupled. The first magnetic pole 780 and the second magnetic pole 780' can be substantially similar to the magnetic pole 380 described above in reference to FIG. 3 and are, therefore, not described in detail herein. The backing member 750 further includes retention members 770 that extend from a surface of the first coupling portion 751 thereby defining recesses 758. In this manner, the first magnetic pole 780 and the second magnetic pole 780' can each be disposed within one of the recesses 758. The retention members 770 can be formed integrally or monolithically with the backing member 750, or alternatively can be formed as separate components mounted on or coupled to the backing member 750. The retention members 770 can have a lower reluctance than the air through which some magnetic flux would otherwise pass, such that the retention members 770 lower overall flux circuit reluctance—a benefit that can be manifested as a further concentration of flux in a desired location.

The size of the retention members 770, particularly their height and width, can be optimized to concentrate flux in any desired manner. Optimally sized retention members 770 can have, for example, a height and width sufficient to carry a desired amount of flux, while not providing an alternate path for flux that would otherwise be directed across, for example, an electromagnetic machine air gap. In some embodiments, the use of retention members 770 can reduce the overall thickness of backing member 750 because the retention members 770 increase the local effective thickness of backing member 750 where necessary to avoid flux saturation.

Figure 8:
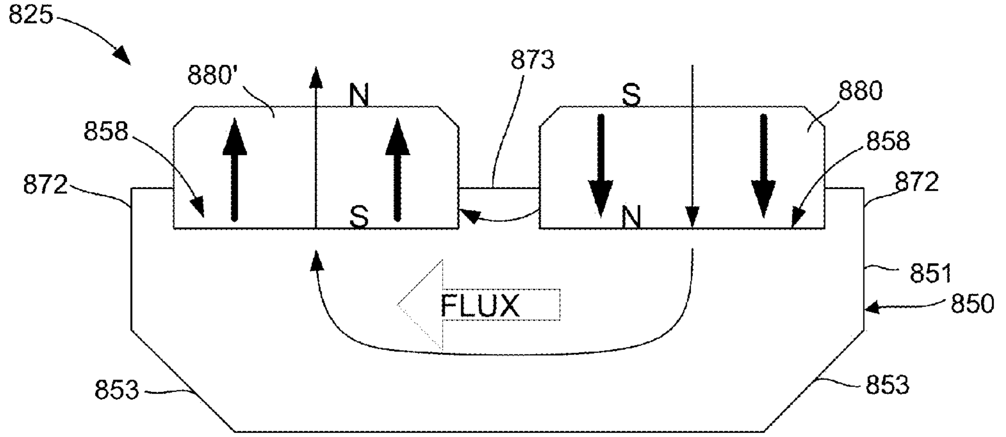

While shown above as having a substantially rectangular cross-section, in some embodiments, a backing member can be different suitable shapes. For example, as shown in FIG. 8, a magnetic assembly 825 includes a backing member 850, a first magnetic pole 880 and a second magnetic pole 880'. The first magnetic pole 880 and the second magnetic pole 880' can be coupled to a first coupling portion 851 of the backing member 850 and can be substantially similar to the magnetic pole 380 described above in reference to FIG. 3. In this embodiment, the backing member 850 defines recesses 858 that can receive therein at least a portion of the magnetic pole 880 and the magnetic pole 880'. The backing member 850 has a length, a width and a thickness (or height). As shown in FIG. 8, the backing member 850 has a thickness at a middle portion 873 (or centerline portion) that is greater than a thickness at lateral side edge portions 872 of the backing member 850. The thicker middle portion 873 assists in carrying the magnetic flux through the backing member 850. The backing member 850 also includes angled portions 853 along the lateral side edges thereby further reducing the weight of the backing member 850. In alternative embodiments, the backing member 850 can include a stepped portion or another cut-out portion, rather than the angled portions 853 to reduce the mass of the backing member 850. Moreover, while shown above as including backing members, retention members, and magnetic poles having rectilinear interfaces, in other embodiments, the interfaces need not be so limited (e.g., curvilinear interfaces or any other suitable configuration).

While not shown in FIGS. 6-8, the backing members 650, 750, and 850, can each include a second coupling portion that can be used to couple the magnetic assemblies 625, 725 and 825 to a support member of, for example, a rotor element (e.g., substantially similar to any of the second coupling portions 352, 452, and 552 described above in reference to FIGS. 3, 4, and 5, respectively). In this manner, any of the magnetic poles and any of the backing members described above (or any combination thereof) can be incorporated into various electromagnetic machines. For example, the backing members 650, 750 and 850 can each include a second coupling portion in the form of a protrusion as described for backing members 350 or 450, or a perimeter flange as described above for backing member 550.

Figure 9:
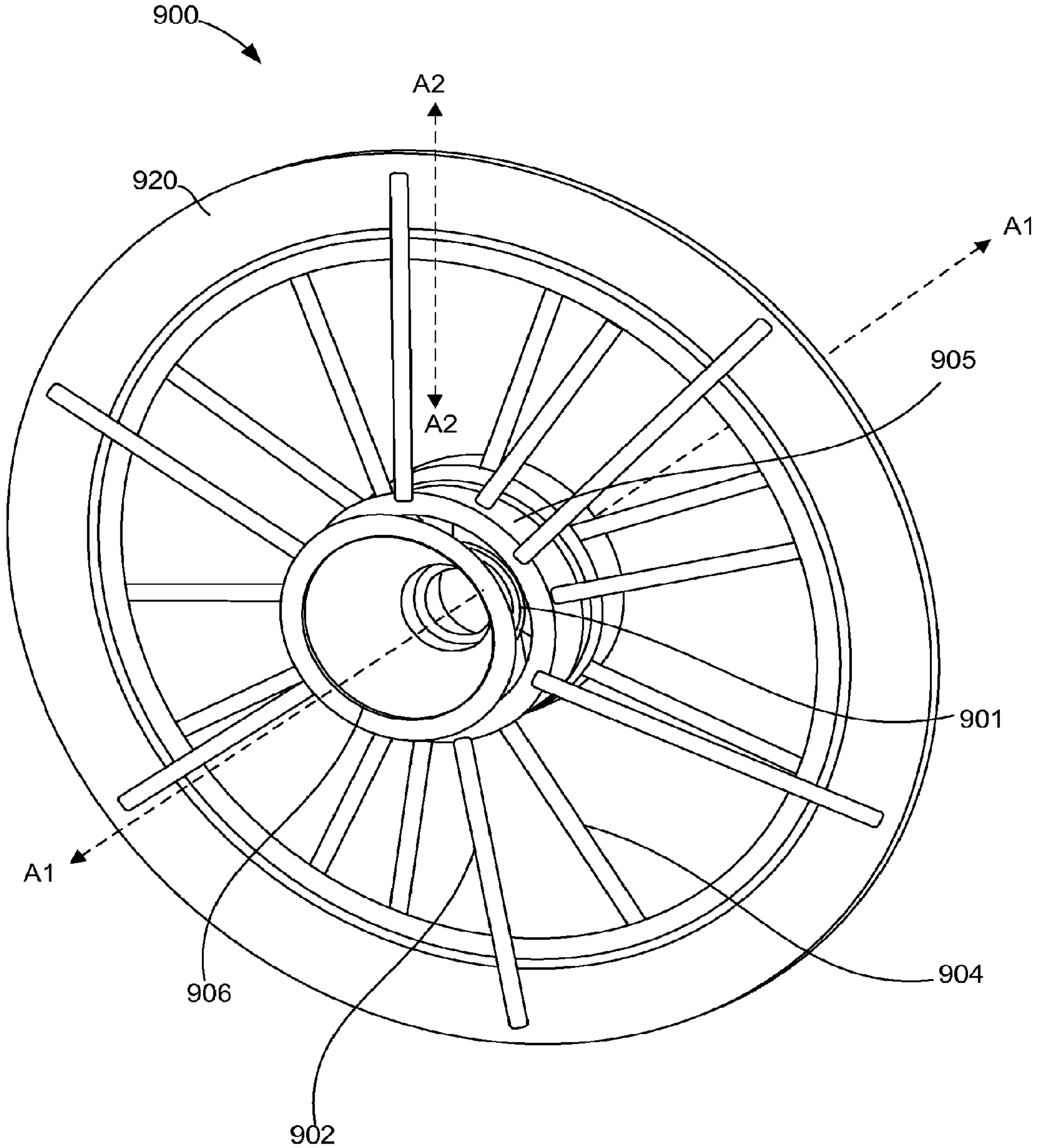
FIG. 9 is a perspective view of a structure for an electromagnetic machine, according to an embodiment.
Figure 10:
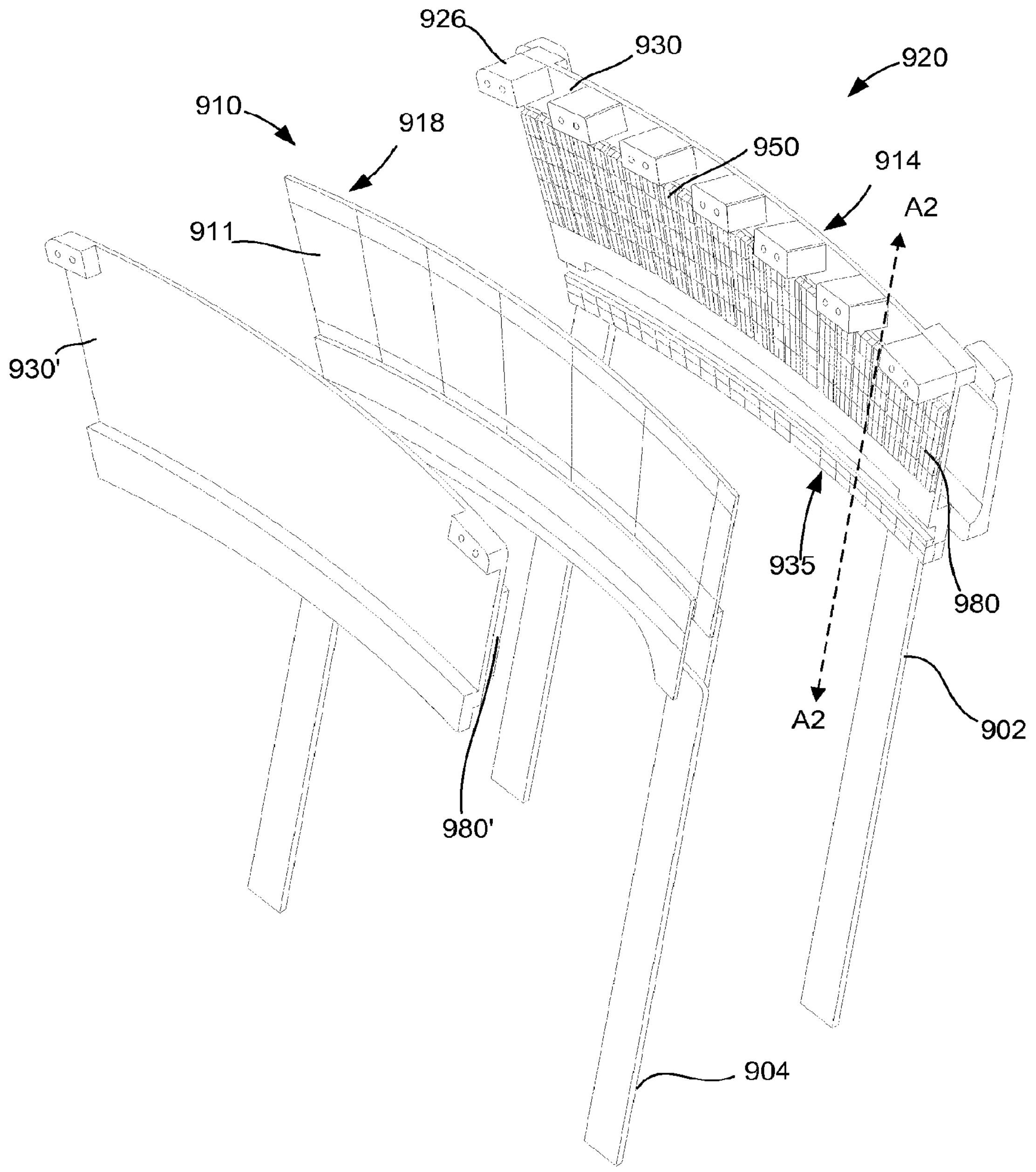
FIG. 10 is an exploded view of a portion of the structure for an electromagnetic machine of FIG. 9.

FIGS. 9 and 10 illustrate a portion of a structure for an electromagnetic machine structure 900 (also referred to herein as "machine structure") according to an embodiment, to which magnetic assemblies, as described above, can be removably coupled. The machine structure 900 includes a segmented annular rotor assembly 920 (also referred to as "rotor assembly") and a segmented annular stator assembly 910 (also referred to as "stator assembly" (not shown in FIG. 9)). The rotor assembly 920 can include multiple rotor segments or portions 914 and the stator assembly 910 can include multiple stator segments or portions 918 that can be coupled together to form the machine structure 900. The stator assembly 910 of this embodiment includes an annular array of stator segments 911 (FIG. 10) that have a circuit board arrangement similar to that described in '625 patent. The machine structure 900 can also include multiple stator supports 904 configured to couple the stator assembly 910 to a stator hub 906. Similarly, the machine structure 900 can include multiple rotor supports 902 configured to couple the rotor assembly 920 to a bearing 901. The bearing 901 can be attached to a rotor hub 905 that extends through a central opening of a stator hub 906 and can function similar to an axle to provide for rotational movement about an axis of rotation (A1-A1 as shown in FIG. 9) of the rotor assembly 920 relative to the stator assembly 910.

As shown in FIG. 10, a rotor segment 914 includes support members 930 and 930' that are disposed on opposite sides of a stator segment 918. The support members 930 and 930' can be any suitable shape, size, or configuration and can be formed from any suitable material. For example, in some embodiments, the support members 930 and 930' are formed from a ferromagnetic material. In other embodiments, the support members 930 and 930' need not be formed from a ferromagnetic material. The support member 930' can be substantially similar in form and function as the support member 930. Therefore, the support member 930' is not described in detail and it should be understood that a discussion of the support member 930 applies to the support member 930' unless explicitly described otherwise.

As shown in FIG. 10, the support member 930 can be coupled to the support member 930' with spacer blocks 926 at an outer diameter portion of support members 930 and 930', such that the support members 930 and 930' can rotate together as a single, structurally rigid subassembly. For example, in some embodiments, the spacer blocks 926 can be coupled to the support members 930 and 930' with a bolt, screw or other coupling mechanism through openings 937 defined in the support member 930. In some embodiments, the support members 930 and 930 can be integrally or monolithically formed with the spacer blocks 926 (in other words, spacer blocks 926 and support member 930 are a single component). Also shown in FIG. 10, the machine structure 900 can include an air gap control system 935 coupled to a radially inboard portion 939 of the support member 930. For example, in some embodiments, an air gap control system can be included that is similar to or the same as an air gap control system described in U.S. patent application Ser. No. 13/445,206, the disclosure of which is incorporated herein by reference in its entirety.

Figure 11:
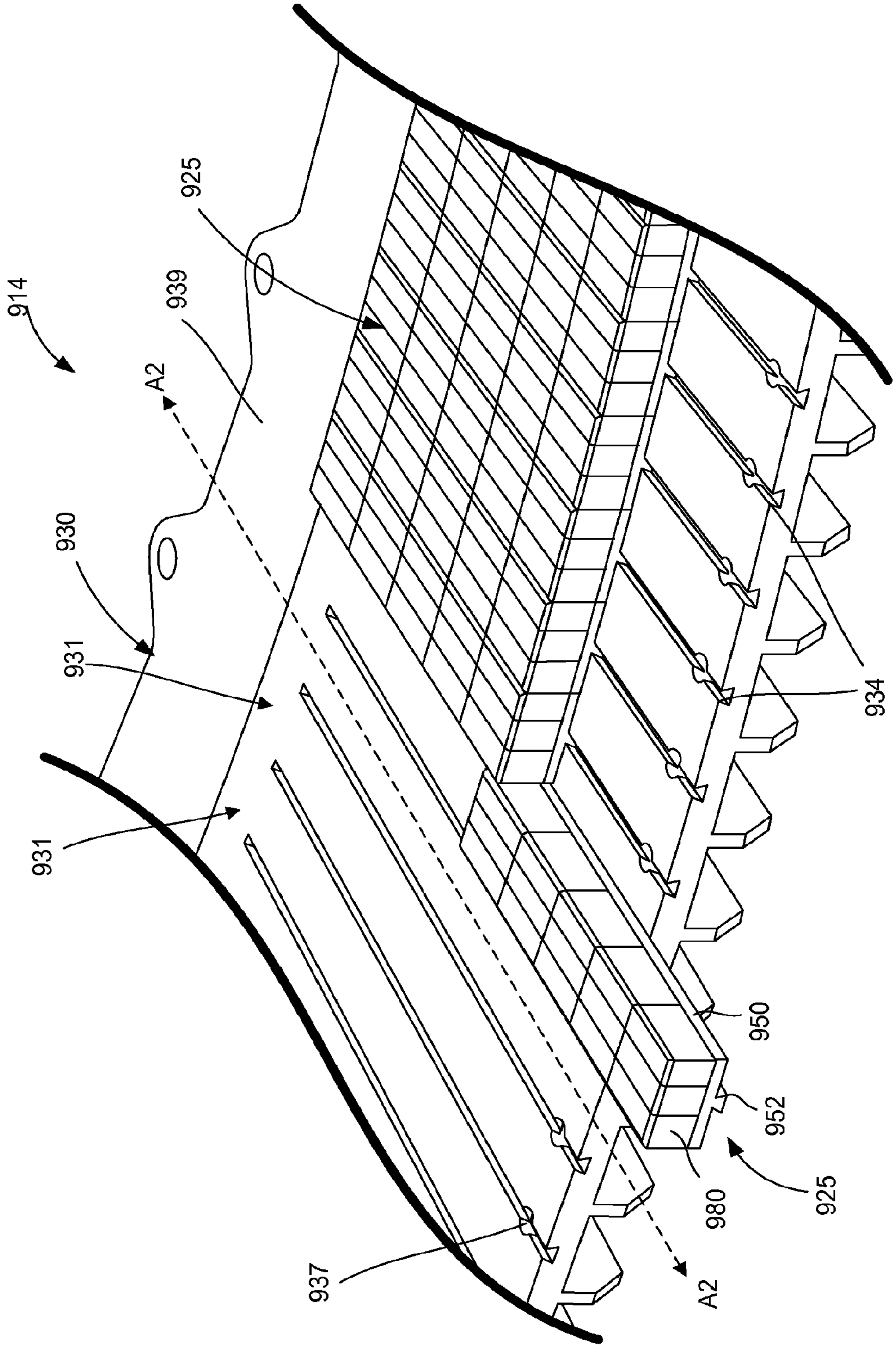
FIG. 11 is a perspective view of a portion of a rotor assembly of the structure for an electromagnetic machine of FIGS. 9 and 10.

As shown in FIG. 11, in this embodiment, the support member 930 includes multiple coupling portions 931, each of which can be used to couple a magnetic assembly 925 to the support member 930. The magnetic assemblies 925 can each include a backing member 950 and a magnetic pole 980. The backing member 950 can include a coupling portion that can be removably coupled to a coupling portion 931. More specifically, as shown in FIGS. 10 and 11, the coupling portions 931 each include a dovetail-shaped groove 934 defined along a longitudinal axis A2-A2 defined in the support member 930 that is perpendicular to the axis of rotation A1-A1, and that are configured to removably and slidably receive a dovetail-shaped coupling portion 952 of the backing member 950. For example, the backing member 950 and the magnetic pole 980 can be substantially similar to the backing member 350 and the magnetic pole 380 described above in reference to FIG. 3. In this manner, the magnetic pole 980 can be coupled to the backing member 950 and the coupling portion 952 of the backing member 950 can be removably disposed within one of the grooves 934 of the coupling portions 931 of the support member 930.

In some embodiments, when the coupling portion 952 of the backing member 950 is disposed within one of the grooves 934, the coupling portion 952 and the walls defining the groove 934 can form a friction fit. Thus, the backing member 950 and the magnetic pole 980 can be retained within the groove 934. In other embodiments, the coupling portion 952 of the backing member 950 can be retained within the groove 934 defined by the support member 930 by a mechanical fastener (e.g., a screw, a bolt, a pin, or the like). In still other embodiments, the backing member 950 is retained in the groove 934 via a portion of a magnetic force introduced by the magnetic pole 980.

In this manner, any suitable number of magnetic poles 980 and backing members 950 (i.e., magnetic assembly 925) can be coupled to the support member 930 to form the rotor segment 914. Furthermore, as described above for previous embodiments, the backing member 950 can be formed of a ferromagnetic material and can be operative to define a flow of magnetic flux. Expanding further, the location and spacing of the coupling portions 931 of the support member 930 can allow adjacent backing members 950 to be sufficiently close to each other to allow for a magnetic flux to flow between adjacent backing members 950. In this manner, the support member 930 need not be formed from a ferromagnetic material.

While shown in FIG. 11 as having a single magnetic pole 980 coupled to the backing member 950, in other embodiments, the magnetic assemblies 925 can each include two or more magnetic poles coupled to the backing member 950 (e.g., as described in FIGS. 6-8). In such embodiments, it may be desirable to define the grooves 934 at a sufficient spaced distance from one another such that magnetic flux does not substantially flow between adjacent backing members 950. In this manner, the magnetic poles 980 and the backing member 950 to which they are coupled can define a magnetic flux flow path that substantially does not leak into the magnetic flux flow path of the adjacent backing member 950 and magnetic poles 980.

In an alternate embodiment, the coupling portions 931 can include grooves 934 that have a substantially T-shaped cross-section. In such an embodiment, the coupling portion 952 of the backing members 950 can be substantially T-shaped (see e.g., the backing member 450 of FIG. 4) and can each be removably and slidably disposed within the grooves 934.

Figure 12:
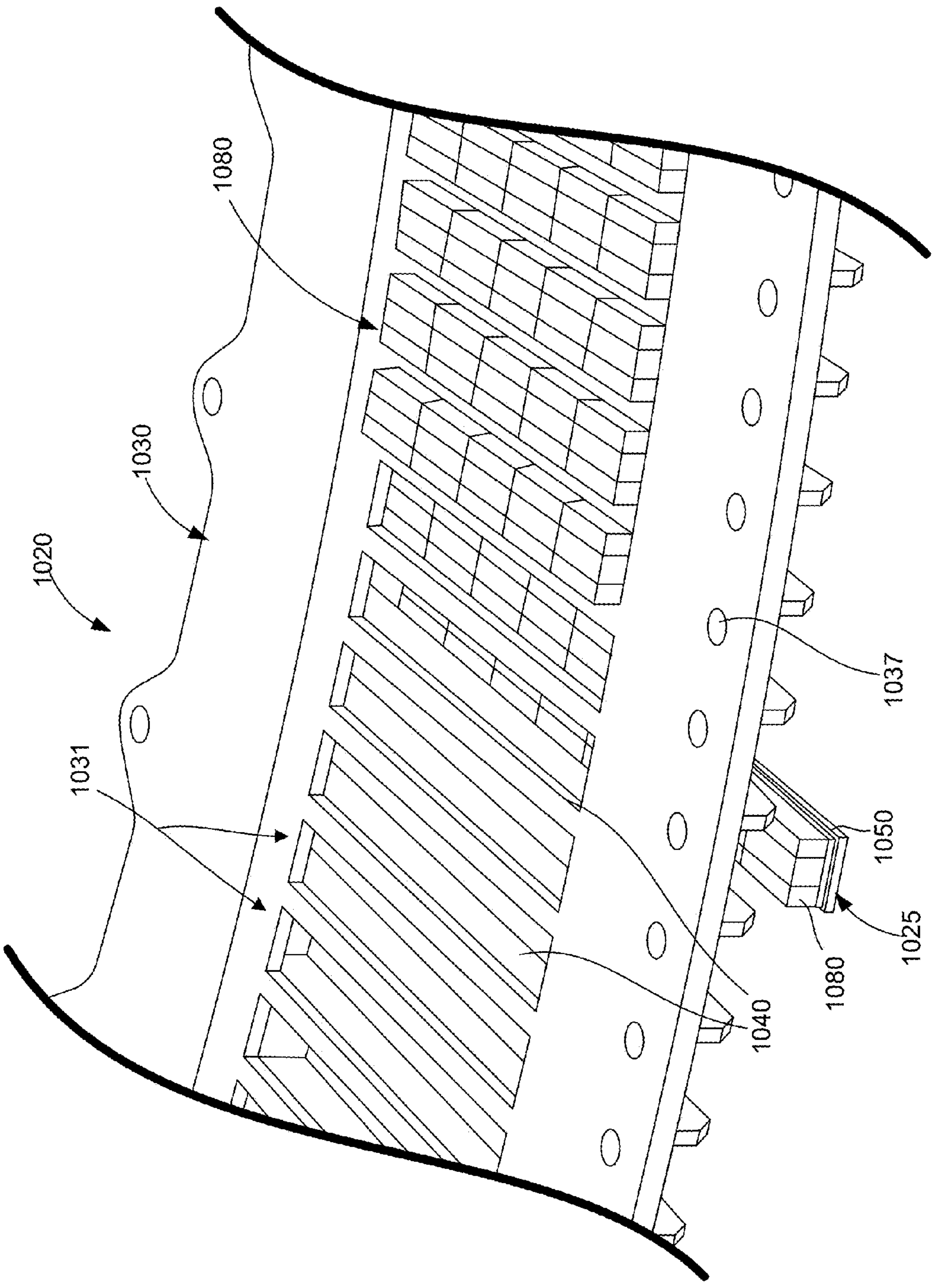
FIG. 12 is a perspective view of a portion of a rotor assembly, according to another embodiment.

FIG. 12 is an enlarged view of a portion of a rotor assembly 1020 according to an alternate embodiment. The rotor assembly 1020 includes a support member 1030 that can include multiple coupling portions 1031. The support member 1030 can be coupled to another support member (not shown) in a similar manner as described above for rotor segment 914. For example, spacer blocks (not shown) can be coupled to the support member 1030 at openings 1037 defined in the support member 1030. In this embodiment, the coupling portions 1031 each include an opening 1040 defined in the support member 1030 and each are configured to removably receive a portion of a magnetic assembly 1025. Each magnetic assembly 1025 includes a magnetic pole 1080 and a backing member 1050. For example, in some embodiments, the magnetic assemblies 1025 can each be substantially similar to the magnetic assembly 525 described above in reference to FIG. 5. In this manner, for each magnetic assembly 1025, the magnetic pole 1080 can be coupled to the backing member 1050 and a coupling portion 1052 (e.g., a perimeter flange) of the backing member 1050 can contact a surface (not shown in FIG. 12) of the support member 1030 when the magnetic pole 1080 is inserted through the opening 1040.

In some embodiments, to retain the magnetic assembly 1025 coupled to the support member 1030 the magnetic pole 1080, the backing member 1050 and the opening 1040 can be sized such that the backing member 1050 and the walls defining the opening 1040 form a friction fit. In other embodiments, the backing member 1050 and/or the magnetic pole 1080 can be removably retained within the opening 1040 defined by the support member 1030 by a mechanical fastener (e.g., a screw, a bolt, a pin, or the like). In still other embodiments, the magnetic assembly 1025 is retained coupled to the coupling portion 1031 of the support member 1030 at least in part by a magnetic attraction between the magnetic pole 1080 and a magnetic pole on a rotor portion disposed opposite or facing the magnetic pole 1080 on the other side of a stator, as further described below.

Figure 13:
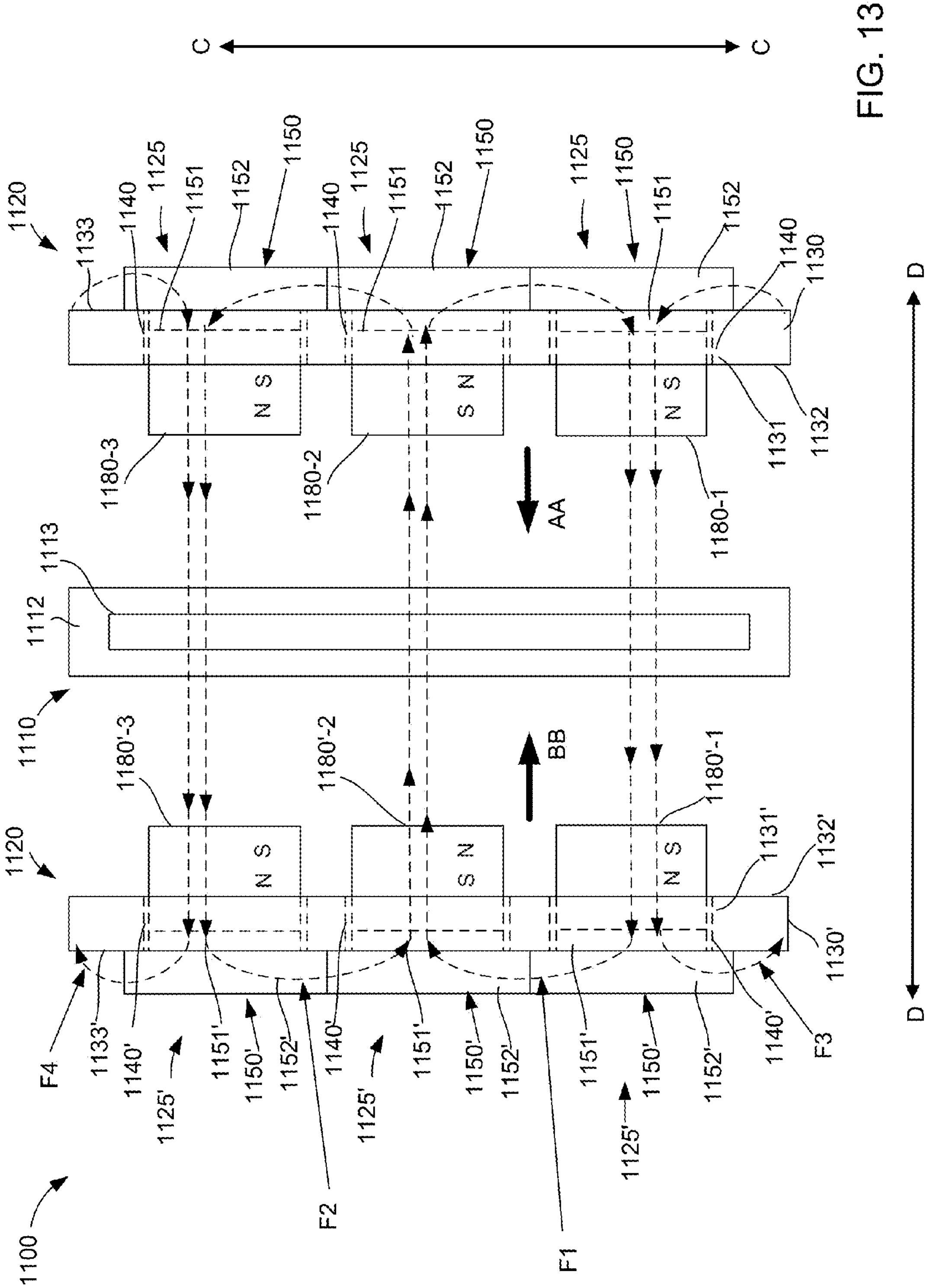
FIG. 13 is a schematic illustration of a portion of a structure for an electromagnetic machine, according to another embodiment.

FIG. 13 is a schematic illustration of a portion of a structure for an electromagnetic machine 1100 (also referred to herein as "machine structure"), according to an embodiment. The machine structure 1100 includes a rotor assembly 1120 and a stator assembly 1110 (e.g., an air core stator). More specifically, the rotor assembly 1120 is configured to rotate relative to the stator assembly 1110 and includes a pair of support members 1130 and 1130' disposed on opposite sides of the stator assembly 1110. The machine structure 1100 can be configured as a radial flux machine or an axial flux machine. For a radial flux machine, the rotor assembly 1120 can rotate about an axis C-C as shown in FIG. 13. For an axial flux machine, the rotor assembly 1120 can rotate about an axis D-D as shown in FIG. 13. Alternatively, if the rotor assembly 1120 moves linearly, rather than rotationally, with respect to stator assembly 1110, such as reciprocal movement into and out of the plane of FIG. 13, perpendicular to axes C-C and D-D, the electromagnetic machine has a linear machine architecture. In any case, the machine structure 1100 can form at least a portion of an electromagnetic machine configured to convert mechanical energy into electrical energy, as described above.

The stator assembly 1110 can include at least a printed circuit board 1112 configured to encapsulate a set of windings 1113 as described, for example, in the '625 patent incorporated by reference above. Thus, the stator assembly 1110 can transfer a flow of current through the windings 1113 in response to magnetic flux introduced by a portion of the rotor assembly 1120.

The support member 1130 of the rotor assembly 1120 includes a first surface 1132, adjacent to the stator assembly 1110, and a second surface 1133, opposite the first surface 1132. Similar to the support member 1030 described above, the support member 1130 further includes a coupling portion 1131 that includes multiple openings 1140 defined by the support member 1130 each configured to receive a portion of a magnetic assembly 1125. More specifically, the magnetic assemblies 1125 can each include a ferromagnetic backing member 1150 with a first coupling portion 1151 to which a magnetic pole 1180 can be coupled. The magnetic poles 1180 (labeled 1180-1, 1180-2, 1180-3 in FIG. 13) can each be, for example, a magnetic pole as described herein and can be disposed on a backing member 1050 with either the south pole or the north pole of the magnetic pole 1180 facing the backing member 1150. In this embodiment, the magnetic assemblies 1125 can each be coupled to the support member 1130 such that adjacent magnetic poles 1180 have opposite polarity as indicated in FIG. 13 by the south pole (labeled "S") and north pole (labeled "N") labels on the magnetic poles 1180.

The backing member 1150 further includes a second coupling portion 1152 configured to facilitate the coupling of the backing member 1150 to the support member 1130. Specifically, as described, for example, with respect to FIGS. 5 and 12 and magnetic assemblies 525 and 1025, respectively, the second coupling portion 1152 can include a perimeter flange of the backing member 1150. Expanding further, the first coupling portion 1151 of the backing member 1150 disposed within the opening 1140 defined by the support member 1130 such that the magnetic pole 1180 extends through an opening 1140 and is disposed between the stator assembly 1110 and the support member 1130. In this manner, the second coupling portion 1152 (e.g., the perimeter flange of the backing member 1150) can be placed in contact with the second surface 1133 of the support member 1130 to retain the first coupling portion 1151 within the opening 1140 defined by the support member 1130.

Similarly, the support member 1130' includes a first surface 1132', a second surface 1133', and a coupling portion 1131 that includes multiple openings 1140' defined by the support member 1130'. The openings 1140' are each configured to receive a portion of a magnetic assembly 1125'. The magnetic assemblies 1125' can each include a ferromagnetic backing member 1150' with a first coupling portion 1151' to which a magnetic pole 1180' (labeled 1180'-1, 1180'-2, 1180'-3 in FIG. 13) can be coupled as described above for magnetic assemblies 1125. The magnetic assemblies 1125' can each be coupled to the support member 1330' such that adjacent magnetic poles 1180 have opposite polarity as described above for magnetic assemblies 1125. The backing member 1150' further includes a second coupling portion 1152' (e.g., a perimeter flange) configured to facilitate the coupling of the backing member 1150' to the support member 1130' in the same or similar manner as described above for backing member 1150.

Although three magnetic assemblies 1125 and three magnetic assemblies 1125' are shown and described with respect to FIG. 13, it should be understood that the rotor assembly 1120 can include a different number of magnetic assemblies 1125 and 1125'. Further although not shown, the rotor assembly 1120 can include multiple rotor segments that can each include support members similar to, or the same as, support members 1130, 1130, and one or more magnetic assemblies 1125, 1125' coupled to the support members.

As shown in FIG. 13, the support member 1130' and the magnetic assemblies 1125' are arranged in an opposite configuration as the support member 1130' and the magnetic assembly 1125. Thus, each magnetic pole 1180 coupled to the support member 1130 of the rotor assembly 1120 has a polarity opposite to that of each corresponding magnetic pole 1180' coupled to the support member 1130' facing the magnetic pole 1180 on an opposite side of the stator assembly 1110. With the above described configuration, magnetic flux can flow between the magnetic poles 1180 and 1180' as shown by the dashed line flux flow paths F1-F4 in FIG. 13. For example, magnetic flux can flow through a flux flow path F1 from magnetic pole 1180-1 on support member 1130 to magnetic pole 1180'-1 on the support member 1130' on the other side of the stator assembly 1110, through an adjacent backing member 1180' and magnetic pole 1180'-2, and back over to magnetic pole 1180-2 adjacent to magnetic pole 1180-1 on the support member 1130. In addition, magnetic flux can flow from magnetic pole 1180-1 to magnetic pole 1180'-1 as shown by the partial flux flow path F3, through an adjacent backing member (not shown) on support member 1130' on the other side of magnetic pole 1180'-1, through a magnetic pole (not shown) coupled to the adjacent backing member, and back over to a magnetic pole (not shown) on the support member 1130 adjacent to the magnetic pole 1180-1, and then to magnetic pole 1180-1. Magnetic flux can also flow between magnetic poles 1180 and 1180' as shown by the flux flow paths F2 and F4 in a similar manner. Thus, in this example, magnetic flux can flow into magnetic pole 1180'-2 from one or both flux flow paths F1 and F2, and magnetic flux can flow into magnetic pole 1180-1 from one or both flux flow paths F1 and F3. Similarly, magnetic flux can flow into magnetic pole 1180-3 from one or both flux flow paths F2 and F4.

Further, the arrangement of the magnetic poles 1180 and 1180' is such that an attractive force exists between them. Thus, the attractive force acts in the direction of the arrow AA to retain the backing members 1150 at least partially disposed within the openings 1140 defined by the support member 1130. Furthermore, the second coupling portion 1152 of the backing members 1150 is in contact with the second surface 1133 of the support member 1130, such that the backing members 1150 and the magnetic poles 1180 are at least temporarily maintained in position relative to the support member 1130. In a similar manner, the attractive force acts in the direction of the arrow BB to retain the backing members 1150' at least partially within the opening 1140' defined by the support member 1130'. In addition, the rotor assembly 1120 can be configured such that a desired spacing (e.g., air gap) exists between the magnetic poles 1180 and 1180' and the stator assembly 1110 to define an optimal positioning to produce a flow of current through the windings 1113.

Figure 14:
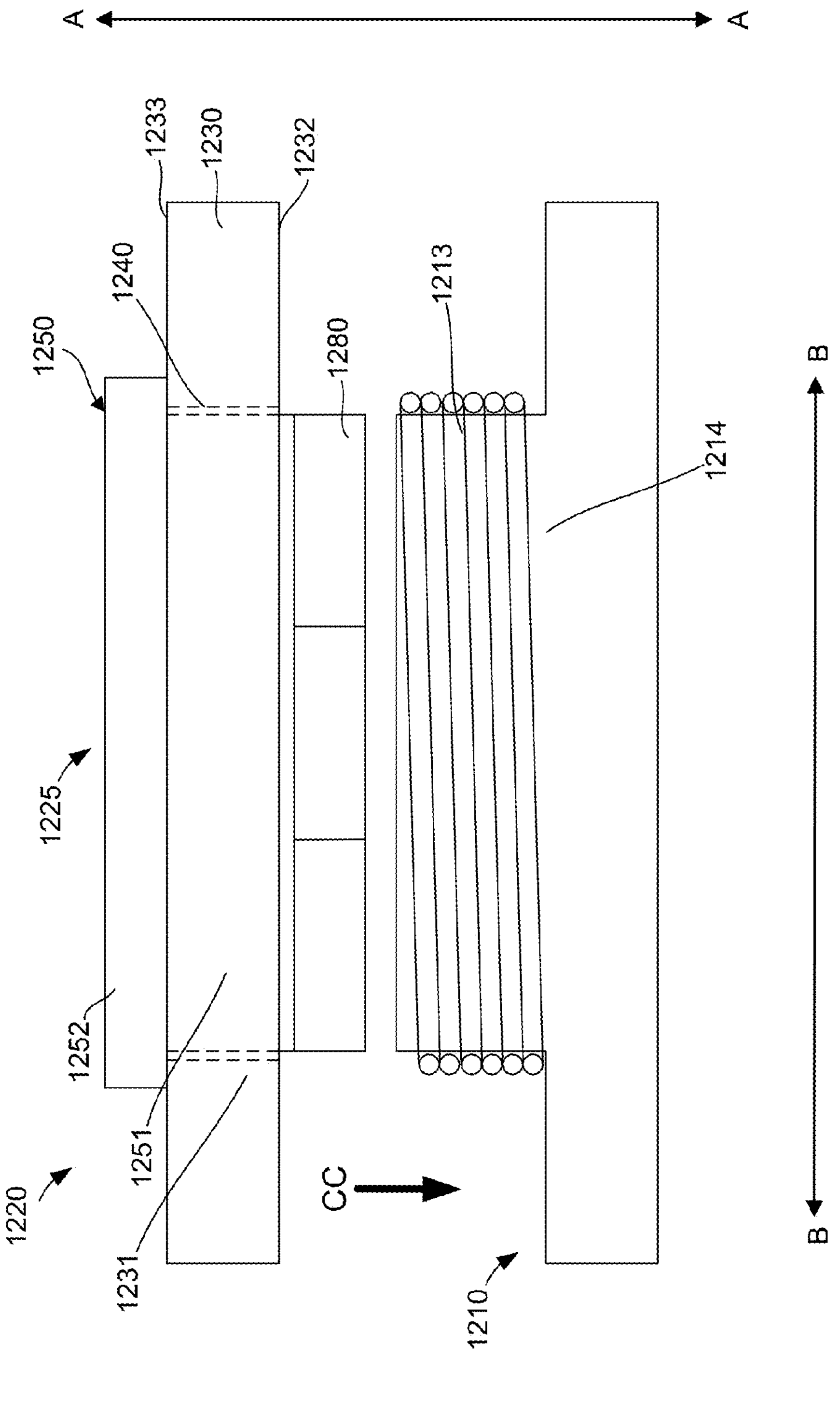
FIG. 14 is a schematic illustration of a portion of a structure for an electromagnetic machine, according to an embodiment.

Although the above described embodiments illustrate a two-sided air core electromagnetic machine structure, the features, functions and methods described can also be implemented in a structure for an electromagnetic machine that includes a one-sided rotor and stator assembly, and a structure for an iron core electromagnetic machine having a one-sided or two-sided rotor and stator assembly. For example, FIG. 14 is a schematic illustration of a portion of a structure for an electromagnetic machine 1200 (also referred to as "machine structure") having a one-sided iron core magnetic assembly, according to an embodiment. Such an embodiment may be desirable in, for example, a radial flux iron core machine, where flux alternates in an up/down direction through the iron core. The machine structure 1200 includes a rotor assembly 1220 and a stator assembly 1210. More specifically, the rotor assembly 1220 is configured to move (e.g., rotate or translate) relative to the stator assembly 1210 and includes a support member 1230. The stator assembly 1210 includes an iron core 1214 configured to support conductive windings 1213 which are wound around the iron core 1214. In this manner, the stator assembly 1210 can transfer a flow of current through the windings 1213 in response to magnetic flux introduced by a portion of the rotor assembly 1220.

As described above, for example, with respect to machine structure 1100, the machine structure 1200 can be configured as a radial flux machine and have an axis of rotation about an axis B-B shown in FIG. 14, or as an axial flux machine and have an axis of rotation about an axis A-A shown in FIG. 14. Alternatively, the rotor assembly 1220 can be configured to move linearly, rather than rotationally, as described above for rotor assembly 1120.

The support member 1230 of the rotor assembly 1220 includes a first surface 1232, adjacent to the stator assembly 1210, and a second surface 1233, opposite the first surface 1232. The support member 1230 further includes a coupling portion 1231 that defines an opening 1240 configured to receive a portion of a magnetic assembly 1225. The magnetic assembly 1225 includes a ferromagnetic backing member 1250 with a first coupling portion 1251 configured to be coupled to a magnetic pole 1280. The magnetic pole 1280 can be, for example, a magnetic pole (e.g. a permanent magnet) as described herein.

The backing member 1250 further includes a second coupling portion 1252 configured to facilitate the coupling of the backing member 1250 to the support member 1230. Expanding further, the first coupling portion 1251 of the backing member 1250 is disposed within the opening 1240 defined by the support member 1230 such that the magnetic pole 1280 is disposed at least partially through the opening 1240 and between the stator assembly 1210 and the support member 1230. In this manner, the second coupling portion 1252 of the backing member 1250 (e.g., a perimeter flange of the backing member) can be placed in contact with the second surface 1233 of the support member 1230 to retain the first coupling portion 1251 within the opening 1240 defined by the support member 1230.

In use, the magnetic pole 1280 and the iron core 1213 of the stator assembly 1210 define a flow of a magnetic flux. More specifically, the arrangement of the magnetic pole 1280 and the iron core 1213 is such that an attractive force exist therebetween. Thus, an attractive force acts in the direction of the arrow CC to retain the backing member 1250 at least partially within the opening 1240 defined by the support member 1230. For example, a force upon the magnetic assembly 1225 is in the direction of CC, but on the stator is acting upwards, so that they are attracted to each other. In the case of a one-sided iron-core machine as shown in FIG. 14, the rotor assembly 1220 and the stator assembly 1210 can be held apart, by for example, structural elements, such as a bearing (e.g., bearing 901 described with respect to FIGS. 9 and 10). In the case of a 2-sided air core machine (e.g., as shown with respect to FIGS. 9-11), those forces can be reacted through the spacer blocks (e.g., spacer blocks 926 shown in FIG. 10) at an outer diameter of the rotor assembly 1220, and not supported by the bearing.

Furthermore, with the second coupling portion 1252 maintained in contact with the second surface 1233 of the support member 1230, the magnetic assembly 1225 is at least temporarily maintained in a given position relative to the support member 1230. In addition, the rotor assembly 1220 can be configured such that a desired spacing (e.g., air gap) exists between the magnetic pole 1280 and the stator assembly 1210 to define an optimal positioning to produce a flow of current through the windings 1213.

While the embodiments described in FIGS. 13 and 14 are configured such that backing members couple to support members by being disposed at least partially within openings (e.g., 1140, 1240), in other embodiments, a structure for an electromagnetic machine can include a backing member coupled to a support member in any suitable manner and still function the same as or similar to the embodiments described with respect to FIGS. 13 and 14. For example, in some embodiments, a backing member can be coupled to a support member using a protrusion (e.g., a T-shaped or dove-tail shaped protrusion) in a manner similar to that described above with respect to, for example, FIG. 3 or 4.

Figure 15:
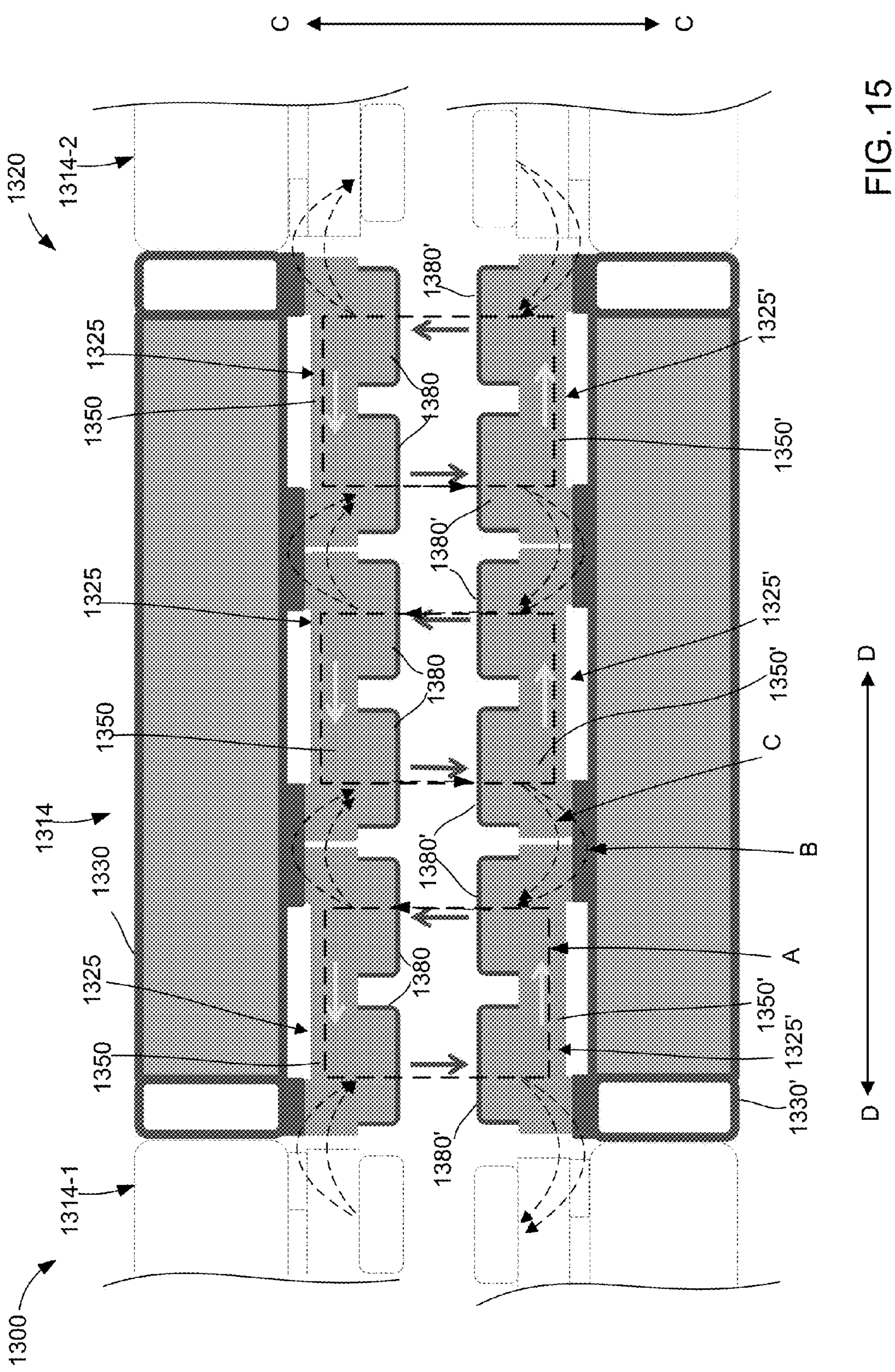
FIG. 15 is a schematic illustration of a portion of a structure for an electromagnetic machine, according to another embodiment.

FIG. 15 illustrates a portion of a structure for an electromagnetic machine, according to another embodiment. A structure for an electromagnetic machine 1300 (also referred to as "machine structure") can include a rotor assembly 1320 configured to rotate relative to a stator assembly (not shown in FIG. 15). The rotor assembly 1320 can include multiple rotor segments 1314 as described above for previous embodiments. As described above, for example, with respect to machine structure 1100, the machine structure 1300 can be configured as a radial flux machine and have an axis of rotation about an axis C-C shown in FIG. 15, or as an axial flux machine and have an axis of rotation about an axis D-D shown in FIG. 15. Alternatively, the rotor assembly 1320 can be configured to move linearly, rather than rotationally, as described above for rotor assembly 1120.

The rotor segment 1314 includes a first support member 1330 and a second support member 1330' disposed on opposite sides of the stator assembly (not shown in FIG. 15). The support members 1330 and 1330' can each be, for example, a welded steel tube support structure as shown in FIG. 15. In alternative embodiments, the support members 1330 and 1330' can be any suitable shape, size, or configuration and can be formed from any suitable material as described herein. The support members 1330 and 1330' can be coupled together with, for example, spacer blocks (not shown) as described above for machine structure 900.

In this embodiment, multiple magnetic assemblies 1325 are coupled to the support structure 1330 and multiple magnetic assemblies 1325' are coupled to the support member 1330'. The magnetic assemblies 1325, 1325' can be coupled to the respective support members 1330, 1330' with various coupling methods, such as, for example, the coupling methods described herein for previous embodiments. The magnetic assemblies 1325 can each include a backing member 1350 and a pair of magnetic poles 1380 coupled to the backing member 1350. Similarly, the magnetic assemblies 1325' can each include a backing member 1350' and a pair of magnetic poles 1380' coupled to the backing member 1350. In this embodiment, magnetic flux can be carried within the backing members 1350, 1350' between the corresponding magnetic pole pair 1380, 1380' on the backing members 1350, 1350'. Thus, each magnetic assembly 1325 and its corresponding magnetic assembly 1325' on the opposite side of the stator assembly (not shown) can have a magnetic flux flow path as shown by the flux path A in FIG. 15. A magnetic flux flow path can also exist between adjacent backing members 1350, and between adjacent backing members 1350' as shown by the magnetic flux path B in FIG. 15. Further, if the support members 1330 and 1330' are also formed with a ferromagnetic material an additional magnetic flux flow path can exist between adjacent backing members 1350 and between adjacent backing members 1350' that passes through a portion of the support members 1330, 1330' as shown by the magnetic flux flow path C in FIG. 15. The flux flow paths B and C can also flow between adjacent rotor segments of the machine structure 1300. For example, adjacent rotor segments 1314-1 and 1314-2 (shown in dashed lines) can be disposed on each side of the rotor segment 1320, and magnetic flux can flow between magnetic assemblies 1325, 1325' of the rotor segment 1320, and magnetic assemblies of the adjacent rotor segments 1314-1 and 1314-2.

Because the magnetic pole pairs 1380, 1380' on each backing member 1350, 1350' can contain the flow of flux within the backing member 1350, 1350', reliance on additional mating surfaces to carry flux can be eliminated. In other words, the magnetic flux does not necessarily pass through the support members 1330, 1330'. Such an arrangement can allow magnetization in the magnetic poles 1380, 1380' and in some cases, can reduce manufacturing cycle times. For example, the magnetic assemblies 1325, 1325' can each be magnetized, which can result in magnetization of the magnetic pole pair 1380 or 1380' on a given backing member 1350 or 1350' of the magnetic assembly 1325, 1325. Furthermore, magnetization of magnetic assemblies 1325 and 1325' in this manner can result in the magnetization of the backing members 1350 and 1350'. With such magnetization further improvements to magnetic performance by both providing an additional source of magnetic field, and improving the permeability of the backing members 1350, 1350' can be achieved.

In addition, the mating surfaces between the support members 1330, 1330' and the backing members 1350, 1350', can be machined or ground to reduce material and improve manufacturability. As described above, because the interface between the support members 1330, 1330' and the backing members 1350, 1350' does not carry flux, welding of pads on the support structures 1330, 1330' at the interface can be done without interfering with the permeability of the backing members 1350, 1350'.

Although not shown in FIG. 15, the magnetic assemblies 1325 and 1325' can be coupled to the respective support members 1330, 1330' with coupling features and methods as described above for previous embodiments. For example, in some embodiments, the backing members 1350, 1350' can include a protrusion that can be slidably received within a groove or opening in the respective support member 1330, 1330'.

Figure 16:
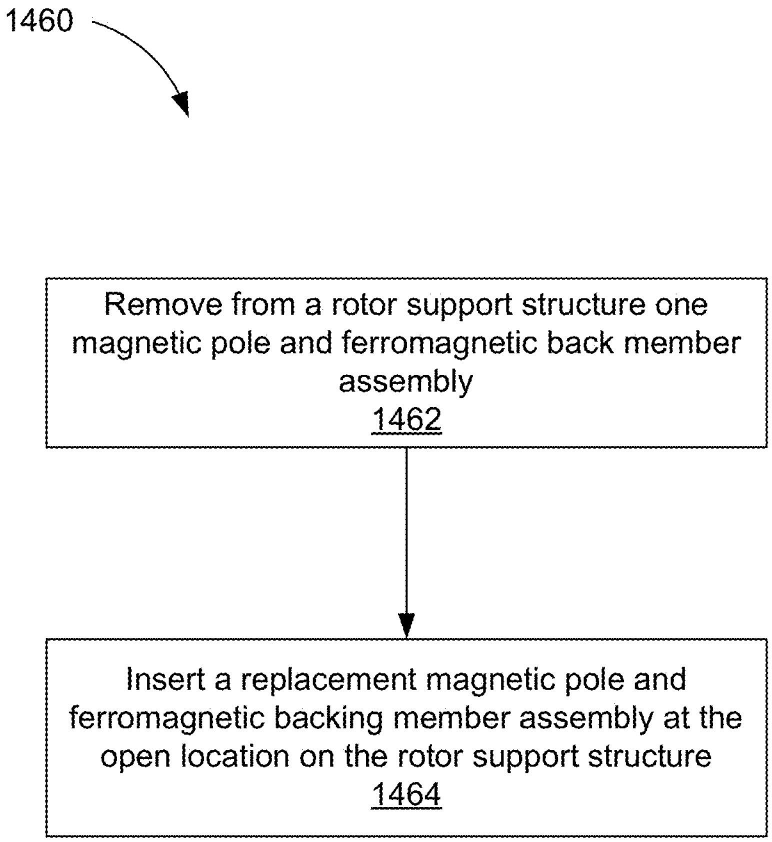
FIG. 16 is a flowchart illustrating a method of repairing or remanufacturing a rotor assembly including magnetic pole assemblies, according to an embodiment.

Referring now to FIG. 16, a flowchart illustrates a method for repairing or remanufacturing a rotor assembly having any number of magnetic pole and ferromagnetic backing member assemblies (e.g., 125, 225, 325, 425, 525, etc.) releasably retained on a rotor support structure. For example, in some embodiments, a magnetic pole can become faulty over time and can lead to degradation in performance of an electromagnetic machine (e.g., a generator or a motor). The magnetic pole and ferromagnetic backing member assemblies (also referred to in this embodiment as "magnetic assembly") can be any of those described herein. For example, in some embodiments, multiple magnetic poles can be disposed on one ferromagnetic backing member. In other embodiments, a single magnetic pole can be disposed on one ferromagnetic backing member. In some embodiments, a magnetic pole can include flux focusing magnets such as, those described herein.

The method 1460 includes removing from a rotor support structure a magnetic assembly at 1462. In some embodiments, the removing of the magnetic assembly can include overcoming a magnetic attractive force between the magnetic assembly and a portion of the rotor support structure such as, for example, an iron core stator or an opposing magnetic pole (the arrangement of which is described above). In some embodiments, the removing of the magnetic assembly can include decoupling the magnetic assembly from the rotor support structure by removing a mechanical fastener (e.g., screws, bolts, pins, clasps, and/or any other retention member in use). In some embodiments, the removing of the magnetic assembly can include slidably removing the magnetic assembly from the rotor support structure; for example, in a radial direction (e.g., a portion of the magnetic assembly can be disposed within a radial slot or groove defined by the rotor support structure). In other embodiments, the removing of the magnetic assembly can include removing the magnetic assembly from an opening defined by the rotor support structure in an axial direction.

With the desired magnetic assembly removed from the rotor support structure, the method 1460 includes inserting a replacement magnetic assembly at the open location on the rotor support structure (e.g., where the magnetic assembly was removed) at 1464. The inserting of the replacement magnetic assembly can include sliding a portion of the magnetic assembly into a slot, a groove, or an opening defined by the rotor support structure. In some embodiments, the inserting of the replacement magnetic assembly can further include coupling the replacement magnetic assembly to the rotor support structure, at least temporarily. In some embodiments, the inserting of the replacement magnetic assembly introduces an attractive force between the replacement magnetic assembly and a portion of the rotor support structure, thereby releasably coupling the replacement magnetic assembly to the rotor support structure.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

For example, a magnetic assembly (i.e., a magnetic pole and backing member assembly) as described herein can be a variety of different shapes and/or sizes, and can include different quantities and types of magnetic pole assemblies than those shown with respect to specific embodiments. In another example, any of the magnetic assemblies described herein can be sealed in any suitable manner such as those described herein. Furthermore, in embodiments including multiple magnetic poles coupled to a backing member (e.g., as shown in FIGS. 6-8), the magnetic poles can be collectively sealed or independently sealed.

In addition, it should be understood that the features, components and methods described herein can be implemented on a variety of different types of electromagnetic machines, such as, for example, axial, radial, and linear machines that can support rotational and/or linear or translational movement of a rotor assembly relative to a stator assembly. Furthermore, the features, components and methods described herein can be implemented in air core electromagnetic machines as well as iron core electromagnetic machines.

What is claimed is:

1. An apparatus comprising:

a rotor element configured to be disposed for movement relative to a stator, the rotor element including:

an annular support member defining a groove in a planar surface of the annular support member; and a backing member formed at least in part of a ferromagnetic material, a magnetic pole assembly coupled to the backing member, the magnetic pole assembly and the backing member collectively forming a magnetic assembly, the backing member including a protrusion configured to removably couple the magnetic assembly to the annular support member, the protrusion on the backing member being insertable into the groove defined by the annular support member such that at least a portion of the magnetic assembly is located on the planar surface of the support member and the protrusion and the groove define a longitudinal axis that is perpendicular to an axis of rotation of the rotor element.

2. The apparatus of claim 1, wherein the groove in the support member is a dovetail shaped groove defined in the support member, the protrusion on the backing member is a dovetail shaped protrusion defined by the backing member configured to be slidably received within the groove.

3. The apparatus of claim 1, wherein the groove in the support member is a T-shaped groove defined in the support member, the protrusion on the backing member is a T-shaped protrusion defined by the backing member configured to be slidably received within the groove.

4. The apparatus of claim 1, further comprising:

a coating encapsulating the magnetic pole assembly.

5. The apparatus of claim 1, wherein the magnetic pole assembly has a length and a width, the backing member has a length greater than the length of the magnetic pole assembly and a width greater than the width of the magnetic pole assembly.

6. The apparatus of claim 1, wherein the support member is formed of a nonferromagnetic material.

7. The apparatus of claim 1, further comprising:

a retainer member coupled to the magnetic pole assembly and coupled to the backing member, the retainer member configured to maintain the magnetic pole assembly coupled to the backing member.

8. The apparatus of claim 1, wherein the backing member has been permanently magnetized.

9. The apparatus of claim 1, wherein the magnetic pole assembly is a first magnetic pole assembly, the apparatus further comprising:

a plurality of magnetic pole assemblies coupled to the backing member, the plurality of magnetic pole assemblies including the first magnetic pole assembly, the backing member and the plurality of magnetic pole assemblies collectively configured to be removably coupled to the support member.

10. The apparatus of claim 9, wherein the plurality of magnetic pole assemblies includes a first pole assembly having a first polarity, and a second pole assembly having a second polarity, opposite to the first polarity.

11. The apparatus of claim 9, wherein the support member is a first support member, the plurality of magnetic pole assemblies is a first plurality of magnetic pole assemblies, the apparatus further comprising:

a second support member configured to be coupled to the first support member; and a second plurality of magnetic pole assemblies coupled to the second support member such that the second plurality of magnetic pole assemblies is disposed at a non-zero distance from the first plurality of magnetic pole assemblies, each magnetic pole assembly in the first plurality of magnetic pole assemblies having a polarity opposite to that of each corresponding one of the magnetic pole assemblies in the second plurality of magnetic pole assemblies.

12. The apparatus of claim 9, further comprising:

a coating encapsulating the plurality of magnetic pole assemblies.

13. The apparatus of claim 9, wherein the plurality of magnetic pole assemblies includes a first pole assembly having a first polarity, and a second pole assembly having a second polarity, opposite to the first polarity, the backing member defines a first recess and a second recess, the first magnetic pole assembly disposed at least partially within the first recess, the second magnetic pole assembly disposed at least partially within the second recess.

14. The apparatus of claim 9, wherein the backing member has a length, a width and a thickness, the length being greater than the width, the thickness being greater at a centerline extending along the length than at a lateral side edge.

15. The apparatus of claim 9, further comprising:

a retainer member coupled to the plurality of magnetic pole assemblies and coupled to the backing member, the retainer member configured to maintain the plurality of magnetic pole assemblies coupled to the backing member.

16. The apparatus of claim 9, wherein the backing member has been permanently magnetized.

17. The apparatus of claim 1, wherein the support member is a first support member, the backing member is a first backing member, the apparatus further comprising:

a stator;

the rotor element disposed for movement relative to the stator, a first plurality of magnetic pole assemblies coupled to the first backing member, the first plurality of magnetic pole assemblies including the magnetic pole assembly, the first backing member and the first plurality of magnetic pole assemblies collectively configured to be removably coupled to the first support member;

a second support member; and a second plurality of magnetic pole assemblies coupled to a second backing member formed of a ferromagnetic material, the second backing member and the second plurality of magnetic pole assemblies collectively configured to be removably coupled to the second support member such that the second plurality of magnetic pole assemblies is disposed at a non-zero distance and facing the first plurality of magnetic pole assemblies, each magnetic pole assembly in the first plurality of magnetic pole assemblies having a polarity opposite to that of each corresponding one of the magnetic pole assemblies in the second plurality of magnetic pole assemblies, the first plurality of magnetic pole assemblies and the second plurality of magnetic pole assemblies collectively define an independent magnetic flux path.

18. The apparatus of claim 17, wherein the second support member defines a groove and the second backing member includes a protrusion configured to be slidably received within the groove of the second support member to removably couple collectively the second backing member and the second plurality of magnetic pole assemblies to the second support member.

19. The apparatus of claim 17, further comprising:

a first coating encapsulating the first plurality of magnetic pole assemblies, and a second coating encapsulating the second plurality of magnetic pole assemblies.

20. The apparatus of claim 17, further comprising:

a first retainer member coupled to the first plurality of magnetic pole assemblies and coupled to the first backing member; and a second retainer member coupled to the second plurality of magnetic pole assemblies and coupled to the second backing member.

21. The apparatus of claim 17, wherein the first backing member has been permanently magnetized and the second backing member has been permanently magnetized.

22. An apparatus comprising:

a rotor element configured to be disposed for movement relative to a stator, the rotor element including:

an annular support member defining a first groove, a second groove and a third groove in a planar surface of the annular support member, the second groove being disposed between the first groove and the third groove;

a first magnet assembly, a second magnet assembly, and a third magnet assembly, each of said magnet assemblies including a backing member formed at least in part of a ferromagnetic material and a magnetic pole assembly coupled to the backing member; and the first magnet assembly including a first protrusion removably coupleable to the first groove of the support member, the second magnet assembly including a second protrusion removably coupleable to the second groove of the support member and the third magnet assembly including a third protrusion removably coupleable to the third groove of the support member such that at least a portion of the first magnet assembly, a portion of the second magnet assembly and a portion of the third magnet assembly are located on the planar surface of the support member, the first groove, the second groove and the third groove each define a longitudinal axis that is perpendicular to an axis of rotation of the rotor element, the second magnet assembly being removable from the second groove while the first magnet assembly is coupled to the first groove, and while the third magnet assembly is coupled to the third groove.

23. The apparatus of claim 22, wherein the first magnet assembly is removably and slidably coupleable to the first groove of the support member, the second magnet assembly is removably and slidably coupleable to the second groove of the support member and the third magnet assembly is removably and slidably coupleable to the third groove of the support member.

* * * * *